US012776711B2

(12) United States Patent
Zhang et al.

(10) Patent No.: US 12,776,711 B2
(45) Date of Patent: Oct. 27, 2026

(54) METHOD AND CONTROL CIRCUIT FOR OPERATING A POWER CONVERTER ARRANGEMENT AND POWER CONVERTER ARRANGEMENT

(71) Applicant: Infineon Technologies Austria AG, Villach (AT)

(72) Inventors: Daifei Zhang, Zurich (CH); Jonas Emanuel Huber, Aarau (CH); Johann Walter Kolar, Zurich (CH)

(73) Assignee: Infineon Technologies Austria AG, Villach (AT)

( * ) Notice: Subject to any disclaimer, the term of this patent is extended or adjusted under 35 U.S.C. 154(b) by 171 days.

(21) Appl. No.: 18/772,663

(22) Filed: Jul. 15, 2024

(65) Prior Publication Data

US 2025/0038667 A1 Jan. 30, 2025

(30) Foreign Application Priority Data

Jul. 26, 2023 (EP) .................................... 23187819

(51) Int. Cl.
*H02M 3/158* (2006.01)
*H02M 1/42* (2007.01)

(52) U.S. Cl.
CPC ........ *H02M 3/1584* (2013.01); *H02M 1/4208* (2013.01)

(58) Field of Classification Search
CPC .. H02M 1/007; H02M 1/0095; H02M 1/0058; H02M 1/0025; H02M 1/4225; H02M 1/4291; H02M 1/0003; H02M 1/0067; H02M 1/4233; H02M 1/0074; H02M 1/0077; H02M 1/0009; H02M 1/0093; H02M 1/4208; H02M 7/217; H02M 7/4837
See application file for complete search history.

(56) References Cited

U.S. PATENT DOCUMENTS

| | | | | |
|---|---|---|---|---|
| 2016/0020708 | A1* | 1/2016 | Nakagawa ........ | H02M 7/53875 363/131 |
| 2019/0372465 | A1 | 12/2019 | Xu et al. | |
| 2024/0317087 | A1* | 9/2024 | Schafmeister .......... | B60L 53/14 |

FOREIGN PATENT DOCUMENTS

| | | | |
|---|---|---|---|
| DE | 102020214265 | A1 | 5/2022 |
| DE | 102021206982 | A1 | 1/2023 |

OTHER PUBLICATIONS

Extended European Search Report, EP 23 187 819.0, Jan. 19, 2024, pp. 1-7.

(Continued)

*Primary Examiner* — Bryan R Perez
(74) *Attorney, Agent, or Firm* — Armis IP Law, LLC

(57) ABSTRACT

A method for operating a power converter arrangement, a controller for controlling operation of a power converter arrangement, and a power converter arrangement are disclosed. The method includes operating a power converter arrangement in a first operating mode. The power converter arrangement includes: a first power converter (1) comprising input nodes (a, b, c) each configured to receive a respective one of input voltages (Va, Vb, Vc) each referenced to a first ground node (n), and configured to provide first and second intermediate voltages (Vx, Vz) each referenced to a second ground node (y); and a second power converter connected between the first power converter (1) and an output (p, r) of the power converter arrangement.

24 Claims, 12 Drawing Sheets

(56) References Cited

OTHER PUBLICATIONS

Hagemeyer Marc, et al., "Comparison of Unidirectional Three- and Four-Wired-Based Boost PFC-Rectifier Topologies for Non-Isolated Three-Phase EV On-Board Chargers Under Common-Mode Aspects", 2021 IEEE Applied Power Electronics Conference and Exposition (APEC), IEEE, Jun. 14, 2021, pp. 569-576, XP033944965.

* cited by examiner

METHOD AND CONTROL CIRCUIT FOR OPERATING A POWER CONVERTER ARRANGEMENT AND POWER CONVERTER ARRANGEMENT

RELATED APPLICATIONS

This application claims priority to earlier filed European Patent Application Serial Number EP 2318 7819 entitled “METHOD AND CONTROL CIRCUIT FOR OPERATING A POWER CONVERTER ARRANGEMENT AND POWER CONVERTER ARRANGEMENT,”, filed on Jul. 26, 2023, the entire teachings of which are incorporated herein by this reference.

BACKGROUND

This disclosure relates in general to a method for operating a power converter arrangement, in particular, a power converter arrangement that may be used for charging a battery, such as a battery of an electric vehicle (EV).

BRIEF DESCRIPTION OF INVENTION

A power converter arrangement for charging a battery may include a first power converter connected to a power grid and a second power converter connected between the first power converter and the battery. The first power converter may be implemented as an AC-DC converter that generates an intermediate voltage (DC link voltage) based on alternating input voltages received from the power grid. The second power converter generates a regulated output current or a regulated output voltage based on the DC link voltage to supply the battery. The second power converter usually provides galvanic isolation between the first power converter and the power grid on one side and the battery on the other side. Having this galvanic isolation, the voltage provided to the battery is referenced to a fixed potential that is separate from a ground potential to which the alternating input voltages are referenced to. In this way, a current from the battery to ground can be avoided.

The galvanic isolation may be implemented using a transformer. A transformer, however, is costly and significantly contributes to the overall size of the second power converter. It is therefore desirable to implement the second power converter without a galvanic isolation.

Furthermore, the first power converter may include several converter stages, wherein each converter stage is connected to a respective input node for receiving a respective alternating input voltage from the power grid. A power converter connected to a three-phase power grid, for example, includes three converter stages. Each converter stage usually includes at least one electronic switch that is operated in a switched-mode (pulse-width modulated (PWM) mode). In certain operating scenarios of the power converter arrangement, it is possible to operate the first power converter in a reduced switching mode. This includes to deactivate each but one of the converter stages. Deactivating converter stages reduces the power consumption required to operate the first power converter and, therefore, increases the efficiency of the power converter arrangement.

There is a need for operating a power converter arrangement with a first converter and a second converter, wherein the second power converter is devoid of a galvanic isolation, in an efficient way.

One example relates to a method. The method includes operating a power converter arrangement in a first operating mode. The power converter arrangement includes a first power converter and a second power converter. The first power converter includes input nodes each configured to receive a respective one of input voltages each referenced to a first ground node, and configured to provide first and second intermediate voltages each referenced to a second ground node. The second power converter is connected between the first power converter and an output of the power converter arrangement. Operating the power converter arrangement in the first operating mode includes adjusting an input power received by the first power converter from the input nodes dependent on an output signal and dependent on a ground signal, and adjusting each of the first and second intermediate voltages by the second power converter. The ground signal is a signal between the first and second ground nodes.

Adjusting the input power received by the first power converter includes obtaining switched node voltage references dependent on the output signal and the ground signal, adjusting the first intermediate voltage includes selecting a maximum switched node voltage reference of the obtained switched node voltage references and adjusting the first intermediate voltage such that the first intermediate voltage tracks the maximum switched node voltage reference, and adjusting the second intermediate voltage includes selecting a minimum switched node voltage reference of the obtained switched node voltage references and adjusting the second intermediate voltage such that the second intermediate voltage tracks the minimum of the obtained switched node voltage references.

Another example relates to a controller configured to operate a power converter arrangement in accordance with this method. Yet another example relates to a power converter arrangement.

Examples are explained below with reference to the drawings. The drawings serve to illustrate certain principles, so that only aspects necessary for understanding these principles are illustrated. The drawings are not to scale. In the drawings the same reference characters denote like features.

BRIEF DESCRIPTION OF DRAWINGS

FIG. 4 illustrates a power converter arrangement of the type illustrated in FIG. 1, wherein FIG. 4 illustrates more detailed examples of the first and second power converters that each include several converter stages;

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

DETAILED DESCRIPTION OF INVENTION

Figure 1:
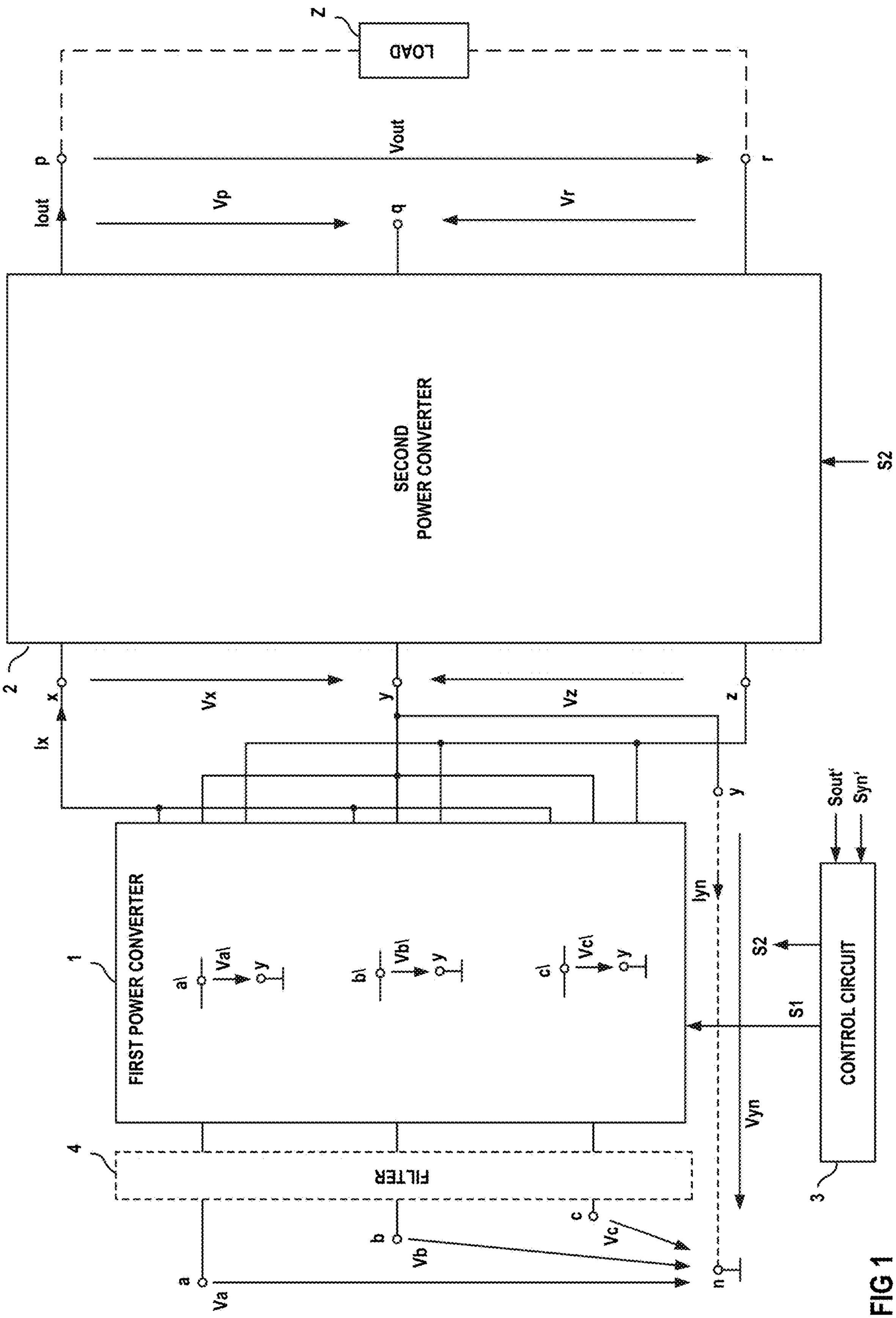
FIG. 1 illustrates one example of a power converter arrangement that includes a first power converter configured to receive input voltages referenced to a first ground node, a second power converter connected between the first power converter and an output, and a control circuit for controlling operation of the first and second power converters.

FIG. 1 illustrates one example of a power converter arrangement that includes a first power converter 1 and a second power converter 2. The first power converter 1 includes a plurality of input nodes a, b, c, wherein each input node a, b, c is configured to receive a respective one of a plurality of input voltages Va, Vb, Vc. The input voltages Va, Vb, Vc are referenced to a first reference node n, which is also referred to as first ground node n in the following. Furthermore, the first power converter 1 is configured to provide a first intermediate voltage Vx and a second intermediate voltage Vz, wherein each of the first and second intermediate voltages Vx, Vz is referenced to a second reference node y, which is also referred to as second ground node y the following. The first intermediate voltage Vx is a voltage between a first intermediate node x and the second ground node y, and the second intermediate voltage Vz is a voltage between a second intermediate node z and the second ground node y. According to one example, the first intermediate voltage Vx is a positive voltage as referenced to the second ground node y, and the second intermediate voltage Vz is a negative voltage as referenced to the second ground node y. In this case, a voltage between the first and second intermediate nodes x, z is positive. In the following, the first and second intermediate voltages Vx, Vz are also referred to as first and second DC link voltages Vx, Vz, and the first and second intermediate nodes x, z are also referred to as first and second DC link nodes x, z.

According to one example, the plurality of input nodes a, b, c includes three input nodes a, b, c, so that the power converter arrangement is configured to receive three input voltages Va, Vb, Vc from a three-phase power grid.

The second power converter 2 is connected between the first power converter 1 and an output p, r of the power converter arrangement. More specifically, the second power converter 2 is connected between the first and second DC link nodes x, z on one side and first and second output nodes p, r on the other side. The output nodes p, r are configured to have a load Z (which is schematically illustrated in dashed lines in FIG. 1) connected thereto. During operation of the power converter arrangement an output voltage Vout is available between the output nodes p, r, and the power converter arrangement supplies an output current Iout at the output nodes p, r to the load Z.

According to one example, the power converter arrangement is configured to regulate at least one of the output voltage Vout and the output current Iout. The load Z may be a battery that is charged by the power converter arrangement. In this example, a voltage level of the output voltage Vout is defined by the load Z and the output current Iout may be regulated by the power converter arrangement such that the output current Iout is in accordance with a predefined output current reference (output current setpoint). This, however, is only an example. According to another example, the power converter arrangement is configured to regulate the output voltage Vout.

Referring to FIG. 1, the power converter arrangement further includes a control circuit 3. The control circuit 3 is configured to control operation of the first power converter 1 and the second power converter 2. In FIG. 1, this is schematically illustrated in that the control circuit 3 provides a first control signal S1 to the first power converter 1 and a second control signal S2 to the second power converter 2. The first control signal S1 represents one or more control signals required to control operation of the first power converter 1. Equivalently, the second control signal S2 represents one or more control signals required to control operation of the second power converter number 2.

According to one example, the first power converter 1 is a PFC (power factor correction) converter that is configured to receive alternating input voltages Va, Vb, Vc, such as power grid voltages, and to provide first and second DC voltages as first and second DC link voltages Vx, Vz.

Figure 2:
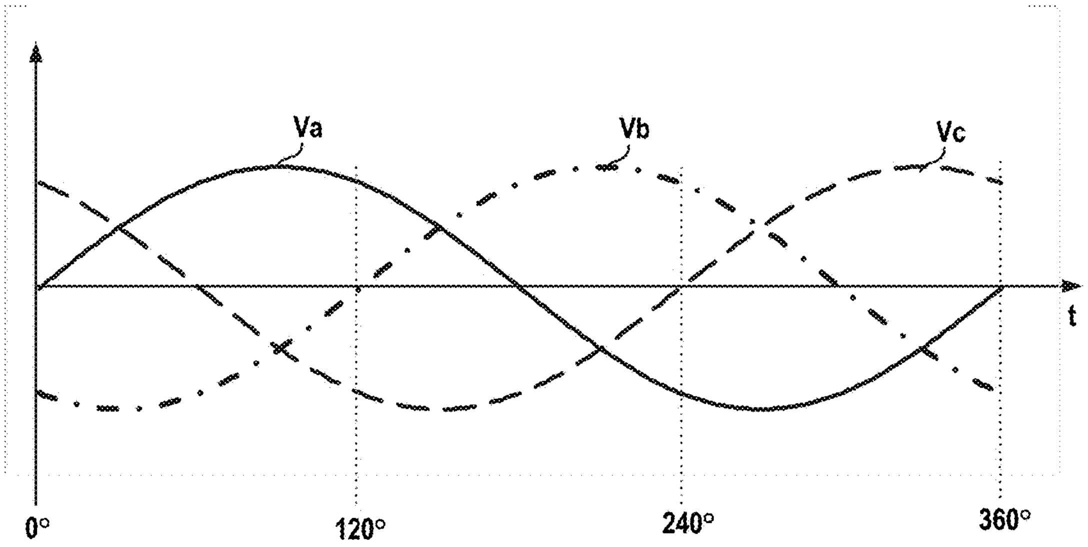
FIG. 2 illustrates signal diagrams of examples of input voltages that may be received by the first power converter.

According to one example, illustrated in FIG. 2, each of the three input voltages Va, Vb, Vc is a sinusoidal input voltage. FIG. 2 shows signal diagrams of three sinusoidal input voltages, which may be received from a three-phase power grid, over one period of the input voltages Va, Vb, Vc. The input voltages Va, Vb, Vc have the same frequency and RMS (root mean-square) value. The frequency is 50 Hz or 60 Hz, and the RMS value is 230 $V_{RMS}$ or 110 $V_{RMS}$, for example. The input voltages Va, Vb, Vc are different by having different phase angles. According to one example, a phase shift between each pair of the input voltages Va, Vb, Vc is 120° (2π/3).

The load Z may be coupled to the first ground node n. Such coupling may include a capacitive coupling or direct (galvanic) connection. Such coupling between the load Z and the first ground node n may cause a current flow between the load Z and the first ground node n. This is undesirable as such current flow may cause a protection device, such as an RCD (residual current detecting) device to trip and deactivate the power converter arrangement. Thus, suitable measures are required in order to prevent such current flow between the load Z and the first ground node n.

One conventional way to avoid such current flow would be to provide a galvanic isolation between the input nodes a, b, c where the input voltages Va, Vb, Vc referenced to the first ground node n are available and the output nodes p, r for connecting the load Z thereto. The galvanic isolation may be implemented using a transformer. A transformer, however, is costly and significantly contributes to an overall size of the power converter arrangement.

The power converter arrangement according to FIG. 1 is therefore devoid of a galvanic isolation between the input nodes a, b, c and the output nodes p, r. In particular, the second power converter 2 is devoid of a galvanic isolation between the first and second intermediate nodes x, z and the output nodes p, r.

The first power converter 1 is a switched-mode converter. This includes that the first power converter 1 includes several switches that are each configured to be operated in a switched-mode. Operating an electronic switch in a switched-mode may include operating the electronic switch in a plurality of successive drive cycles and, in each drive cycle, operating the electronic switch in an on-state (switched on-state) for an on-time and an off-state (switched off-state) for an off-time, so that the electronic switch is switched on and switched off in each drive cycle. A switching frequency fs, which is a reciprocal of the duration Ts of one drive cycle, is between several 10 kHz and several 100 kHz, for example. Switching on and switching off the electronic switch requires energy. Losses associated with switching on and switching off the electronic switch are usually referred to as switching losses. The switching losses of a power converter with several electronic switches increases as the number of electronic switches increases. Furthermore, the switching losses increase as the switching frequency increases. It is therefore desirable to operate the first power converter 1 with reduced switching losses.

Figure 3:
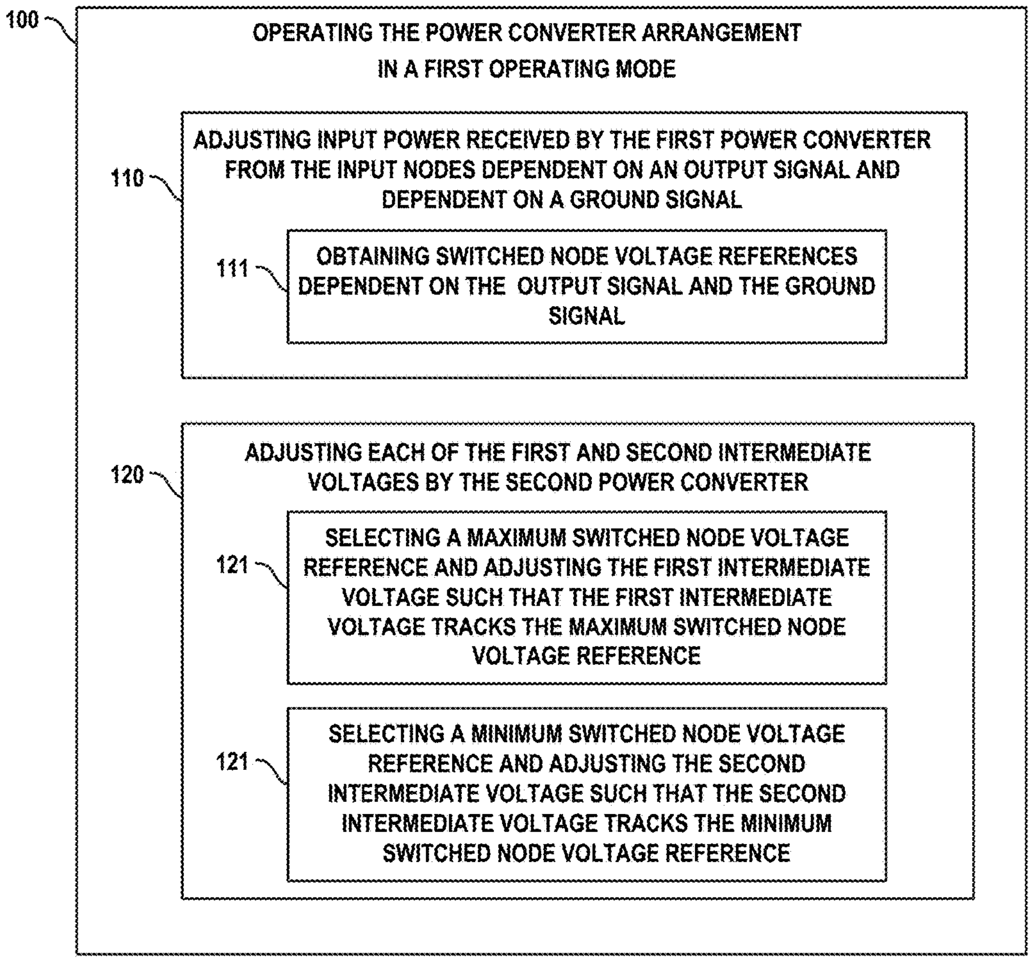
FIG. 3 illustrates one example of a method for operating a power converter arrangement of the type illustrated in FIG. 1.

FIG. 3 illustrates one example of a method for operating the power converter arrangement according to FIG. 1 such that the first power converter 1 operates with reduced switching losses and such that, despite the lack of a galvanic isolation a current between the load Z and the first ground node n is avoided. Referring to FIG. 3 FIGS., the method includes operating the power converter arrangement with the first power converter and the second power converter in a first operating mode (100). Operating the power converter arrangement in the first operating mode includes adjusting input power received by the first power converter from the input nodes dependent on an output signal and dependent on a ground signal (110), and adjusting each of the first and second intermediate voltages by the second power converter (120). Furthermore, adjusting the input power received by the first power converter includes obtaining switched node voltage references dependent on the output signal and the ground signal (111), adjusting each of the first and second intermediate voltages by the second power converter includes selecting a maximum switched node voltage from the obtained switched node voltages and adjusting the first intermediate voltage such that the first intermediate voltage tracks the maximum switched node voltage reference (121), and selecting a minimum switched node voltage reference from the obtained switched node voltage references and adjusting the second intermediate voltage such that the second intermediate voltage tracks the minimum switched node voltage reference (122). This method is explained in further detail with reference to the power converter arrangement illustrated in FIG. 1.

Referring to FIG. 1, adjusting the input power received by the first power converter 1 from the input nodes a, b, c dependent on the output signal and dependent on the ground signal includes controlling operation of the first power converter 1 by the control circuit 3 dependent on the output signal and dependent on the ground signal. For this, the control circuit 3 receives a measured output signal Sout' and a measured ground signal Syn'. The measured output signal Sout' represents the output signal of the power converter arrangement that is to be regulated. Thus, the measured output signal Sout' represents the output current Iout when the output current Iout is to be regulated, or represents the output voltage Vout when the output voltage Vout is to be regulated. The measured output signal Sout' can be obtained by measuring the output signal using a conventional current or voltage measurement circuit (not illustrated in FIG. 1). According to one example, the measured output signal Sout' is proportional to the output signal Sout that is to be regulated.

The ground signal Syn is a signal between the first and second ground nodes n, y. The ground signal Syn is either a voltage Vyn between the first and second ground nodes n, y or a current Iyn between the first and second ground nodes n, y. According to one example, the first and second ground nodes y, n are ohmically connected, as illustrated in dashed lines in FIG. 1. In this example, the ground signal Syn is either the voltage Vyn or the current Iyn. According to another example, the first and second ground nodes y, n are not ohmically connected. In this example, the ground signal Syn is the voltage Vyn between the first and second ground nodes n, y. "Not ohmically connected" includes, for example, that the first and second ground nodes n, y are not connected at all or that the first and second ground nodes n, y are capacitively coupled.

By adjusting the input power of the first power converter 1 dependent on the measured output signal Sout' and dependent on the measured ground signal Syn', both the output signal Sout and the ground signal Syn can be regulated. Regulating the output signal Sout includes adjusting the output signal such that the output signal at least approximately equals a predefined output signal reference (output signal setpoint). Furthermore, regulating the ground signal Syn includes adjusting the ground signal Syn such that the ground signal at least approximately equals a predefined ground signal reference Syn* (ground signal setpoint). According to one example, the ground signal reference Syn* is zero, so that the ground voltage Vyn between the first and second ground nodes n, y is zero or, when the first and second ground nodes n, y are connected, the ground current Iyn between the first and second ground nodes n, y is zero. In this case, the second power converter 2 can be implemented without a galvanic isolation without taking the risk that a current flows between the load Z and the first ground node n.

The input power Pin of the first power converter 1 is the power received by the first power converter 1 at the input nodes a, b, c. The input power received at one of the input nodes a, b, c is given by the input voltage Va, Vb, Vc multiplied with the current Ia, Ib, Ic received at the respective input node, so that an overall input power is given by the sum of the input powers received at the respective input nodes a, b, c.

$$\mathrm{Pin} = \mathrm{V}a \cdot Ia + \mathrm{V}b \cdot Ib + \mathrm{V}c \cdot Ic. \quad (1)$$

Voltage levels of the input voltages Va, Vb, Vc received at the respective input nodes a, b, c are defined by the power source, such as a power grid, providing the input voltages Va, Vb, Vc. Thus, the input power received at each of the input nodes a, b, c can be adjusted by adjusting the current level of the respective input current Ia, Ib, Ic.

Adjusting the current levels of the input currents Ia, Ib, Ic includes adjusting voltages Va\, Vb\, Vc\ at switched nodes a\, b\, c\ of the first power converter 1. These voltages, which are referenced to the second ground node y, are referred to as switched node voltages Va\, Vb\, Vc\ in the following. Switched node voltage references Va*, Vb*, Vc* are desired voltage levels of these switched node voltages Va\, Vb\, Vc\. It should be noted that in a steady state of the power converter arrangement the electrical potential at the second ground node y at least approximately equals the electrical potential at the first ground node n, so that the switched node voltages Va\, Vb\, Vc\ can also be considered to be referenced to the first ground node n.

Referring to FIG. 1, the first power converter 1 includes a plurality of switched nodes a\, b\, c\, wherein each of the switched nodes a\, b\, c\ is coupled to a respective one of the input nodes a, b, c. According to one example, each of the switched nodes a\, b\, c\ is inductively coupled to the respective input node a, b, c. This is explained in detail herein further below. Furthermore, each of the switched nodes a\, b\, c\ is coupled to each of the first and second intermediate nodes x, z and the second ground node y. Examples for coupling the switched nodes a\, b\, c\ to the first and second intermediate nodes x, z and the second ground node y are explained in detail herein further below.

As explained in detail herein further below, the switched node voltage Va\, Vb\, Vc\ at each switched node a\, b\, c\ can be adjusted by switching the respective switched node a\, b\, c\ between the second ground node y and one of the first and second intermediate node x, z. Such switching is part of the switched mode operation of the first power converter 1 and associated with switching losses.

When adjusting the first intermediate voltage Vx by the second power converter 2 such that the first intermediate voltage Vx equals a first one of the switched node voltage references Va*, Vb*, Vc*, that one of the switched nodes a\, b\, c\ that has the first switched node voltage reference as its voltage reference can permanently be connected to the first intermediate node x, so that no switching operation is required to adjust the respective switched node voltage. The first one of the switched node voltage references Va*, Vb*, Vc* is the maximum of the switched node voltage references Va*, Vb*, Vc*, for example. Furthermore, when adjusting the second intermediate voltage Vz by the second power converter 2 such that the second intermediate voltage Vz equals a second one of the switched node voltage references Va*, Vb*, Vc*, that one of the switched nodes al, b, c\ that has the second switched node voltage reference as its voltage reference can permanently be connected to the second intermediate node z, so that no switching operation is required to adjust the respective switched node voltage. The second one of the switched node voltage references Va*, Vb*, Vc* is the minimum of the switched node voltage references Va*, Vb*, Vc*, for example. In this way, two of the plurality of switched node voltages a\, b\, c\ are adjusted by the second power converter 2, so that no switching operation is required to adjust these two switched node voltages. Thus, in the power converter arrangement according to FIG. 1 in which the first power converter 1 receives three different input voltages Va, Vb, Vc and includes three switched nodes a\, b\, c\, a switched-mode operation is required only to adjust one of the three switched node voltages Va\, Vb\, Vc\. Thus, as compared to adjusting each of the three switched node voltages Va\, Vb\, Vc\ by a switched-mode operation the switching losses of the first power converter 1 are reduced.

The operating mode of the first power converter 1 according to FIG. 1 in which only one of three switched node Va\, Vb\, Vc\ is adjusted by a switched mode operation may be referred to as 1/3 mode.

Figure 4:
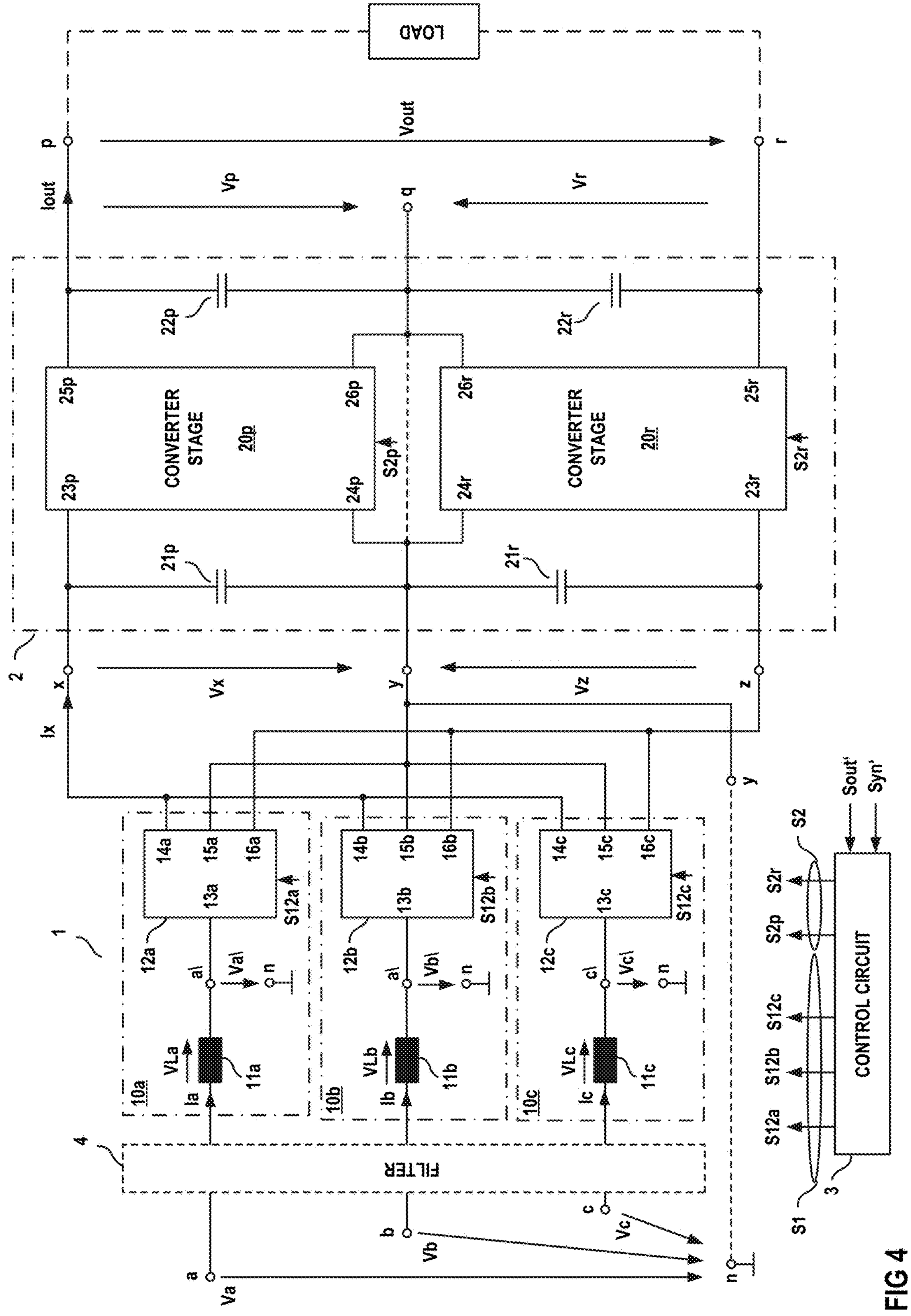

FIG. 4 illustrates examples of the first power converter 1 and the second power converter number 2 in greater detail. Referring to FIG. 4, the first power converter 1 includes a plurality of converter stages 10a, 10b, 10c, wherein each of the converter stages 10a, 10b, 10c is connected between a respective one of the input nodes a, b, c on the one side and the first and second intermediate nodes x, z and the second ground node y on the other side. Furthermore, each of the converter stages 10a, 10b, 10c includes a respective one of the switched nodes a\, b\, c\ explained with reference to FIG. 1.

Referring to FIG. 4, each of the converter stages 10b, 10b, 10c includes an inductor 11a, 11b, 11c that is connected between the input node a, b, c and the switched node al, b\, cl. Furthermore, each of the converter stages 10a, 10b, 10c includes a switching circuit 12a, 12b, 12c that is connected between the switched node a\, b\, c\ on the one side and the first and second intermediate nodes x, z and the second ground node y on the other side. More specifically, each switching circuit 12a, 12b, 12c includes an input node 13a, 13b, 13c connected to the respective switched node a\, b\, c\ and the inductor 11a, 11b, 11c; a first output node 14a, 14b, 14c connected to the first intermediate node x; a second output node 15a, 15b, 15c connected to the second ground node y; and a third output node 16a, 16b, 16c connected to the second intermediate node z.

Each of the switching stages 12a, 12b, 12c is configured to receive a control signal S12a, S12b, S12c governing operation of the respective switching stage 12a, 12b, 12c from the control circuit 3. These control signals S12a, S12b, S12c are part of the control signal S1 illustrated in FIG. 1 that controls operation of the first power converter 1.

Referring to FIG. 4, the second power converter 2 includes two converter stages, a first converter stage 20p and a second converter stage 20r. The first converter stage 20p is connected between the first intermediate node x and the second ground node y on the one side and the first output node p and the third ground node q on the other side. More specifically, the first converter stage 20p includes a first input node 23p connected to the first intermediate node x, a second input node 24p connected to the second ground node y, a first output node 25p connected to the first output node p of the power converter arrangement, and a fourth output node 26p connected to the third ground node q.

The second converter stage 20r is connected between the second ground node y and the second intermediate node z on the one side and the third ground node q and the second output node r on the other side. More specifically, the second converter stage 20r includes a first input node 23r connected to the second intermediate node z, a second input node 24r connected to the second ground node y, a first output node 25r connected to the second output node r of the power converter arrangement, and a second output node 26r connected to the third ground node q.

Each of the first and second converter stages 20p, 20r may include an input capacitor 21p, 21r and an output capacitor 22p, 22r (that are drawn outside the respective converter stage 20p, 20r in the example illustrated in FIG. 4). The input capacitor 21p, 21r is connected between the input nodes 23p, 24p, 23r, 24r of the respective converter stage 20p, 20r, and the output capacitor 22p, 22r is connected between the output nodes 25p, 26p, 25r, 26r of the respective converter stage 20p, 20r.

In the power converter 2 according to FIG. 4, in the first operating mode of the power converter arrangement, the first converter stage 20p is configured to adjust the first intermediate voltage Vx and the second converter stage 20r is configured to adjust the second intermediate voltage Vz. Each of the converter stages 20$p$, 20$r$ is configured to receive a respective control signal S2$p$, S2$r$ from the control circuit 3. These control signals S2$p$, S2$r$ are part of the control signal S2 illustrated in FIG. 1 that controls operation of the second power converter 2.

Referring to FIG. 4, between the output nodes 25$p$, 26$p$ of the first converter stage 20$p$ a first portion Vp of the output voltage Vout is available and between the output nodes 25$r$, 26$r$ of the second converter stage 20$r$ a second portion Vr of the output voltage Vout is available. For the purpose of illustration it is assumed that both output voltage portions are referenced to the third ground node q. The output voltage Vout is given by the first output voltage portion Vp minus the second output voltage portion Vr, for example. According to one example, the first output voltage portion is positive and the second output voltage portion is negative, so that the output voltage Vout between the first and second output nodes p, r is positive.

According to one example, illustrated in dashed lines in FIG. 4, the second and third ground nodes y, q are connected.

In the first power converter 1 according to FIG. 4, controlling the input currents Ia, Ib, Ic of the individual converter stages 10$a$, 10$b$, 10$c$ for controlling the input power Pin includes controlling voltages VLa, VLb, VLc across the inductors 11$b$, 11$b$, 11$c$. The voltage VLa, VLb, VLc across the inductor 11$a$, 11$b$, 11$c$ in each of the converter stages 10$a$, 10$b$, 10$c$ is given by the respective input voltage Va, Vb, Vc minus the respective switched node voltage Va\, Vb\, Vc\, $$\mathrm{V}La = \mathrm{V}a - \mathrm{V}a\backslash \quad (2a)$$

$$\mathrm{V}Lb = \mathrm{V}b - \mathrm{V}b\backslash \quad (2b)$$

$$\mathrm{V}Lc = \mathrm{V}c - \mathrm{V}c\backslash, \quad (2c)$$

so that by adjusting the switched node voltages Va\, Vb\, Vc\ the inductor voltages VLa, VLb, VLc and, therefore, the input currents Ia, Ib, Ic and the input power Pin can be adjusted.

Figure 5:
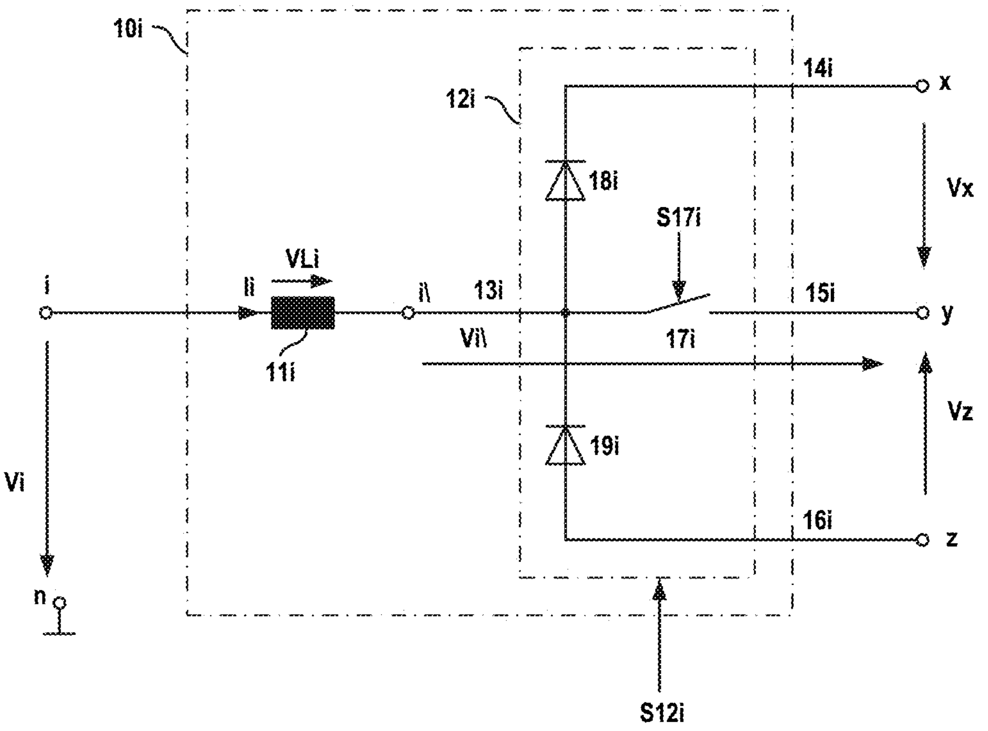
FIGS. 5 and 6 illustrate different examples of one converter stage of the first power converter.

FIG. 5 illustrates one example for implementing the switching circuits 12$a$, 12$b$, 12$c$ in greater detail. More specifically, FIG. 5 illustrates one of the converter stages 10$a$, 10$b$, 10$c$ with a detailed example of the respective switching circuit. Converter stage 10$i$ illustrated in FIG. 5 represents an arbitrary one of the converter stages 10$a$, 10$b$, 10$c$ illustrated in FIG. 4. Furthermore, in FIG. 5, i denotes the respective input node, Vi denotes the respective input voltage; Ii denotes the respective input current, i\ denotes the respective switched node; Vi\ denotes the respective switched node voltage; 11$i$ denotes the respective inductor connected between the input i and the switched node i\; VLi denotes the voltage across the inductor 11$i$, 12$i$ denotes the respective switching circuit; 13$i$ denotes the input of the switching circuit 12$i$; and 14$i$, 15$i$, 16$i$ denote the output nodes of the switching circuits 12$i$. Each of the converter stages 10$a$, 10$b$, 10$c$ may be implemented in accordance with the converter stage 10$i$ illustrated in FIG. 5.

Referring to FIG. 5, the switching circuit 12$i$ includes an electronic switch 17$i$ connected between the switched node i\ and the second output node 15$i$, which is connected to the second ground node y. A first rectifier element 18$i$ is connected between the switched node i\ and the first output node 14$i$, which is connected to the first intermediate node x. A second rectifier element 19$i$ is connected between the switched node i\ and the second intermediate node z.

In the converter stage 10$i$ illustrated in FIG. 5, adjusting the switched node voltage Vi\ includes operating the electronic switch 17$i$ in a switched-mode. According to one example, operating the electronic switch 17$i$ in the switched-mode includes operating the electronic switch 17$i$ in a plurality of successive drive cycles each having the drive cycle duration Ts explained hereinabove and operating the electronic switch 17$i$ in an on-state (switched on-state) for an on-time Ton and an off-state (switched off-state) for an off-time Toff. Durations of the on-time Ton and the off-time Toff may vary in order to adjust the switched node voltage Vi\. According to one example, the electronic switch 17$i$ is operated at a fixed switching frequency, so that the individual drive cycles have the same duration.

During the on-time Ton, the electrical potential at the switched node i\ at least approximately equals the electrical potential at the second ground node y. Referring to the above, the electrical potential at second ground node y is regulated to be at least approximately equal to the electrical potential at the first ground node n, so that during the on-time Ton the voltage VLi across the inductor 11$i$ at least approximately equals the input voltage Vi. This causes a magnitude of the input Ii to increase. The current direction of the input current Ii is dependent on the polarity of the input voltage Vi. When the input voltage Vi is positive, the input current Ii is positive and flows in the direction is illustrated in FIG. 5. When the input voltage Vin is negative, the input current Ii is negative and flows in a direction opposite the direction illustrated in FIG. 5.

During the off-state of the electronic switch 17$i$ the switched node voltage Vi\ is clamped either to the first intermediate voltage Vx by the first rectifier element 18$i$, or to the second intermediate voltage Vz by the second rectifier element 19$i$. In the example illustrated in FIG. 5, the first and second rectifier element 18$i$, 19$i$ are passive rectifier elements, such as diodes. A polarity of the first rectifier element 18$i$ is such that the first rectifier element 18$i$ takes over a positive input current Ii during the off-state of the switching elements 17$i$, so that the first rectifier element 18$i$ clamps the switched node voltage Vi\ to the first intermediate voltage Vx. A polarity of the second rectifier element 90$i$ is such that the second rectifier element 19$i$ takes over and negative input current Ii during the off-state of the switching element 17$i$, so that the second rectifier element 19$i$ clamps the switched node voltage Vi\ to the second intermediate voltage Vz. During the off-state, the magnitude of the input current Ii decreases.

Referring to the above, the input current Ii increases during the on-time Ton and decreases during the off-time. "Adjusting the input current", such as the input current Ii illustrated in FIG. 5, as used herein includes adjusting an average of the input current over the duration of one or more drive cycles. This average input current is dependent on the average switched node voltage Vi\, wherein "adjusting the switched node voltage" as used herein includes adjusting the average switched node voltage over the duration of one or more drive cycles. The (average) switched node voltage over the duration of one drive cycle is given by $$\mathrm{V}i\backslash = \frac{Ton \cdot 0 + Toff \cdot \mathrm{V}x}{Ts}, \quad (3a)$$

when the input voltage Vi and, therefore, the input current Ii is positive and $$Vi\backslash = \frac{Ton \cdot 0 + Toff \cdot Vz}{Ts}, \quad (3b)$$

when the input voltage Vi and, therefore, the input current Ii is negative.

in the following, di, where $$di = \frac{Toff}{Ts}, \quad (4)$$

denotes a duty cycle of the switched-mode operation of the electronic switch 17*i* and, at the same time, the duty cycle of the switched mode operation of the converter stage 10*i*. Based on this and taking into account equations (3*a*) and (3*b*), the (average) switched node voltage is given by $$Vi\backslash = di \cdot Vx \quad (5a)$$

when the input voltage Vin is positive and $$Vi\backslash = di \cdot Vz, \quad (5b)$$

when the input voltage Vi is negative. Thus, the (average) switched node voltage Vi and, therefore, the (average) input current Ii of the converter stage 10*i* can be adjusted by suitably adjusting the duty cycle of the switched mode operation of the converter stage 10*i* in order to adjust the input power received by the converter stage 10*i*.

It should be noted that, except for short durations in which the input voltages Va, Vb, Vc are close to zero crossings, the magnitude of the average inductor voltages VLa, VLb, VLc is low as compared the magnitude of the input voltages Va, Vb, Vc. Thus, the switched node voltages Va\, Vb\, Vc\ essentially follow the input voltages Va, Vb, Vc. The "average inductor voltage" is the average of the voltage VLa, VLb, VLc across one inductor 11*a*, 11*b*, 11*c* over at least one drive cycle of the switched mode operation of the electronic switch 17*i*.

In the example illustrated in FIG. 5, the rectifier elements (clamping elements) 18*i*, 19*i* are passive rectifier elements. This, however, is only an example. According to another example illustrated in FIG. 6, the rectifier elements 18*i*, 19*i* are active rectifier elements that each include an electronic switch 181*i*, 191*i* and a passive rectifier element 182*i*, 192*i*, such as a diode, connected in parallel with the electronic switch. Each of the active rectifier elements 18*i*, 19*i* illustrated in FIG. 6 may the operated such that the electronic switch 181*i*, 191*i* switches on each time the parallel passive rectifier element is forward biased, so that the electronic switch bypasses the passive rectifier element 182*i*, 192*i* in order to reduce conduction losses. Operation of the switches 181*i*, 191*i* of the active rectifier elements 18*i*, 19*i* may be controlled by the control circuit 3 in such a way that, in each drive cycle, one of the electronic switches 181*i*, 191*i* is operated in a complementary fashion to the electronic switch 17*i*. That is, the one of the electronic switches 181*i*, 191*i* is in the on-state when the electronic switch 17*i* is in the off-state and is in the off-state when the electronic switch 17*i* is in the on-state. Which one of the electronic switches 181*i*, 191*i* is operated in the switched-mode is dependent on the polarity of the input voltage Vi. The electronic switch 181*i* in the first rectifier element 18*i* is operated in the switched mode when the input voltage Vi and, therefore, the input current Ii is positive. The electronic switch 191*i* is operated in the switched mode when the input voltage Vi and, therefore, the input current Ii is negative.

According to one example, the electronic switch 17*i* of the switching circuit 12*i* is a bidirectionally blocking electronic switch. A "bidirectionally blocking switch" is an electronic switch that, in the off-state, is configured to block independent of the polarity of a voltage applied across the switch. A bidirectionally blocking electronic switch may be implemented in various ways. Two different examples for implementing bidirectionally blocking switches are illustrated in FIGS. FIGS. 7A and 7B.

Figure 7A:
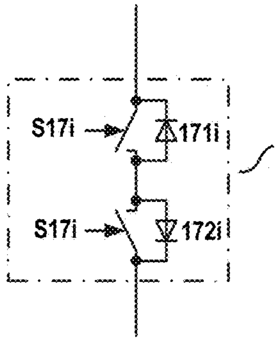
FIGS. 7A and 7B illustrate examples of bidirectional blocking electronic switches.

In the example illustrated in FIG. 7A, the bidirectionally blocking switch 17*i* includes two unidirectionally blocking electronic switches 171*i*, 172*i* connected in series. A "unidirectionally blocking switch" is an electronic switch that, in the off-state, is blocking when the voltage applied across the switch has a first polarity and is conducting when the voltage applied across the switch has a second polarity opposite the first polarity.

Each of the unidirectionally blocking switches 171*i*, 172*i* includes a switching element and a rectifier element, such as a diode, connected in parallel with the switching element. The unidirectionally blocking switches are connected in series such that the freewheeling elements are connected in anti-series. Each of the unidirectionally blocking switches 171*i*, 172*i* can be implemented as a MOSFET, for example. In a MOSFET, the integrated body diode forms the rectifier element. Implementing each of the unidirectionally blocking switches as a MOSFETs, however, is only an example. It is also possible to implement these switches using any other kind of electronic switch and a rectifier element, such as a diode, connected in parallel with the electronic switch.

Figure 7B:
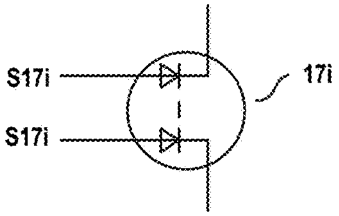

In the example illustrated in FIG. 7B, the bidirectionally blocking switch is implemented as a bidirectionally blocking GaN switch, which is a monolithic implementation of a bidirectional switch.

Each of the bidirectionally blocking switches 17*i* illustrated in FIGS. FIGS. 7A and 7B includes two control nodes, wherein each of these control nodes is connected to the control node of one of the switches 171*i*, 172*i* and is configured to receive a control signal that switches on or switches of the respective switch 171*i*, 172*i*. According to one example, the two control nodes receive the same control signal S17*i*, so that both switches 171*i*, 172*i* switch on and off at the same time.

As explained with reference to FIG. 3, each of the converter stages 10*a*, 10*b*, 10*c* includes an inductor 11*a*, 11*b*, 11*c*. Furthermore, the power converter arrangement may include an input filter 4 that is configured to filter current ripples of the input currents Ia, Ib, Ic that may result from the switched mode operation of the first power converter 1. Although FIG. 4 illustrates one inductor 11*a*, 11*b*, 11*c* in each of the converter stages 10*a*, 10*b*, 10*c* and an input filter 4 connected between the input nodes a, b, c and the converter stages 10*a*, 10*b*, 10*c*, this is only an example. The inductors 11*a*, 11*b*, 11*c* illustrated in FIG. 4 may each include several inductor portions, and the input filter 4 may include several filter stages, wherein the inductor portions and the filters stages are arranged alternatingly between the input nodes a, b, c and the switched nodes a\, b\, c\. One example of such an arrangement is illustrated in FIG. 8.

Figure 8:
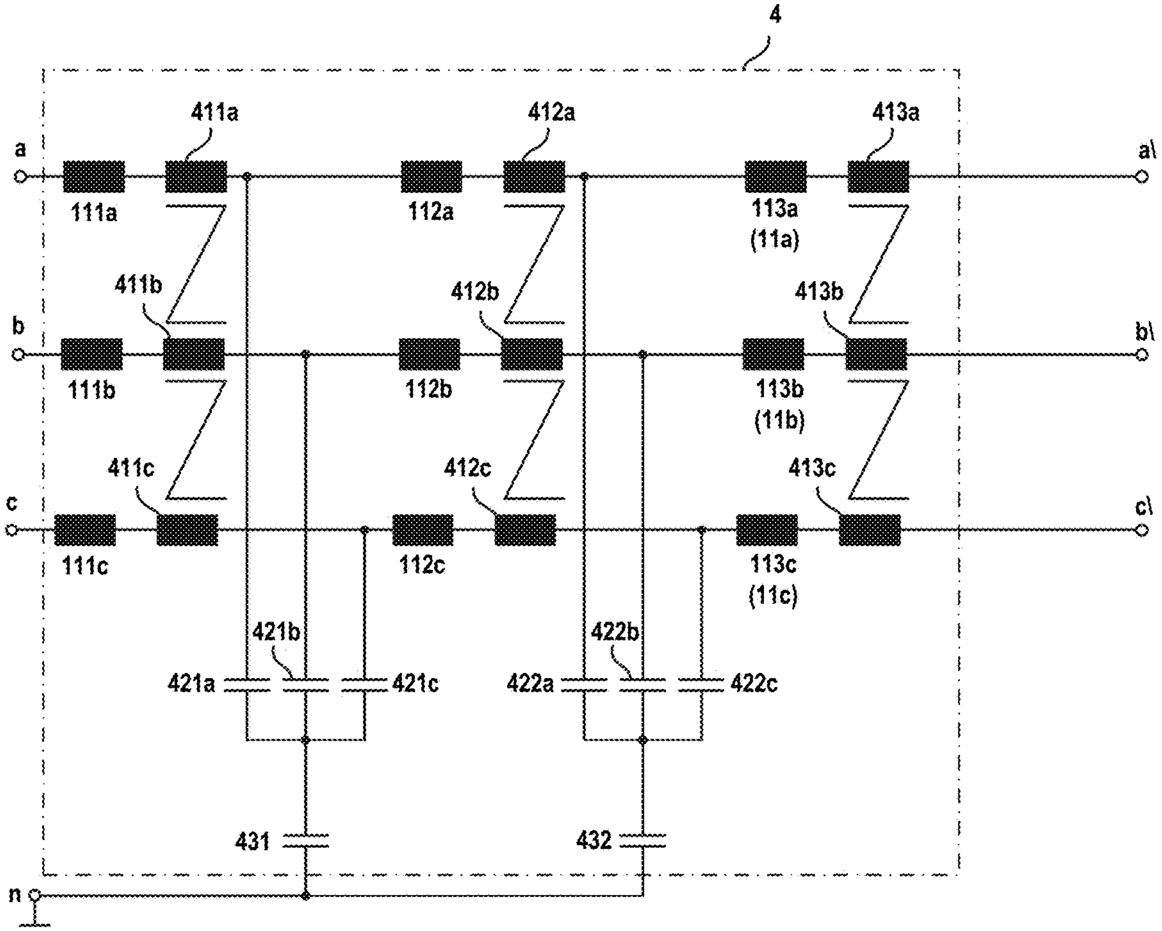
FIG. 8 illustrates one example of an inductor and filter arrangement.

In the example illustrated in FIG. 8, each of the inductors 11*a*, 11*b*, 11*c* includes three inductor portions 111*a*-113*a*, 111*b*-113*b*, 111*c*-113*c*, and the input filter includes three filter stages, wherein each filter stage includes three inductors 411*a*-411*c*, 412*a*-412*c*, 413*a*-413*c*. Between each input node a, b, c and the respective switched node a\, b\, c\ the three inductor portions 111*a*-113*a*, 111*b*-113*b*, 111*c*-113*c* of the power stage inductors 11*a*, 11*b*, 11*c* and inductors of the filter stages are arranged alternatingly. Moreover, the first and second filters stages each include a plurality of capacitors 421*a*-421*c*, 422*a*-422*c*, wherein each of these capacitors couples one of the three inductors 411*a*-411*c*, 412*a*-412*c* to the first ground node n through a respective further capacitor 431, 432.

Figure 9:
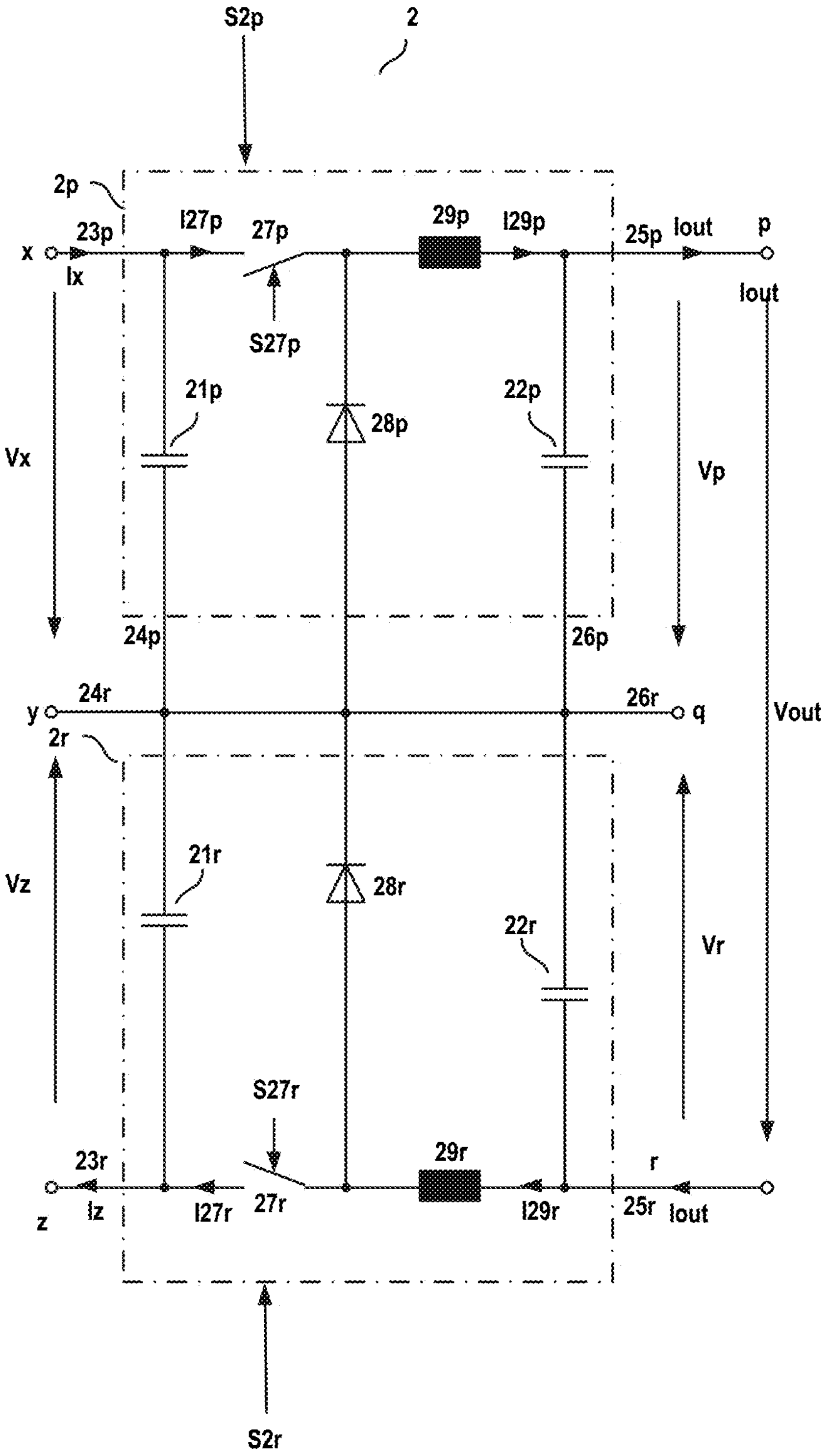
FIG. 9 illustrates one example of first and second converter stages of the second power converter.

FIG. 9 illustrates examples for implementing the first and second converter stages 2*p*, 2*r* of the second power converter 2. In the example illustrated in FIG. 9, each of the first and second converter stages 2*p*, 2*r* is implemented as a buck converter that includes an electronic switch 27*p*, 27*r*, an inductor 29*p*, 29*r*, and a rectifier element (freewheeling element) 28*p*, 28*r*. The rectifier elements 28*p*, 28*r* can be implemented as passive rectifier elements, such as diodes (as illustrated), or as active rectifier elements (synchronous rectifiers).

In the first converter stage 2*p*, the electronic switch 27*p* and the inductor 29*p* are connected in series between the first input node 23*p* and the first output node 25*p*, the rectifier element 28*p* is connected in parallel with a series circuit including the inductor 29*p* and the output capacitor 22*p*. Furthermore, the second input node 24*p* and the second output node 26*p* are connected. In the second converter stage 2*r*, the electronic switch 27*r* and the inductor 29*r* are connected in series between the first input node 23*r* and the first output node 25*r*, the freewheeling element 28*r* is connected in parallel with a series circuit including the inductor 29*r* and the output capacitor 22*r*. Furthermore, the second input node 24*r* and the second output node 26*r* are connected.

The electronic switch 27*p*, 27*r* in each of the converter stages 2*p*, 2*r* can be operated in a switched mode, so that each of the switches 27*p*, 27*r* alternatingly switches on and switches off. The converter stages 2*p*, 2*r* may be operated with a fixed switching frequency, so that each drive cycle of operating the electronic switches 27*p*, 27*r* has the same duration. The switching frequency of operating the first and second converter stages 2*p*, 2*r* of the second power converter to can be in the same range as the switching frequency of the converter stages 10*a*, 10*b*, 10*c* of the first power converter 1.

In the first converter stage 2*p*, when the electronic switch 27*p* is in the on-state, the output current Iout flows through the electronic switch 27*p* and the inductor 29*p*. When the electronic switch 27*p* switches off, the freewheeling element 28*p* takes over the output current Iout from the electronic switch 27*p*.

Referring to FIG. 9, the electronic switch is 27*p*, 27*r* in the first and second converter stages 2*p*, 2*r* are controlled by control signals S27*p*, S27*r*. According to one example, these control signals (drive signals) correspond to the respective control signals S2*p*, S2*r* received by the first and second converter stages 2*p*, 2*r*.

In the second converter stage 2*r*, when the electronic switch 27*r* is in the on-state, the output current Iout flows through the electronic switch 27*r* and the inductor 29*r*. When the electronic switch 27*r* switches off, the freewheeling element 28*r* takes over the current from the electronic switch 27*r*.

Referring to the above, in the first operating mode of the power converter arrangement, the first converter stage 2*p* adjusts the voltage level of the first intermediate voltage Vx. The magnitude of first intermediate voltage Vx increases, for example, when a duty cycle of operating the first converter stage 2*p* is such that an (average) first intermediate current Ix is higher than an (average) switch current 127*p*. In this case, the input capacitor 21*p* is charged so that the first intermediate voltage Vx increases. The "average first intermediate current" is the average of the first intermediate current Ix over one or more drive cycles of the switched-mode operation of the electronic switch 27*p*. The average switch current 127*p* is the average of the current through the switch 27*p* over one or more drive cycles of the switched-mode operation of the electronic switch 27*p*. The first intermediate current Ix is the current received at the first intermediate node x. Equivalently, the first intermediate voltage Vx decreases, when the (average) first intermediate current Ix is lower than the average switch current 127*p*.

The magnitude of the second intermediate voltage Vz increases, for example, when a duty cycle of the switched mode operation of the electronic switch 27*r* in the second converter stage 2*r* is such that a magnitude of an average second intermediate current Iz is higher than a magnitude of an average switch current 127*r*. The "average second intermediate current Iz" is the average of the second intermediate current Iz over one or more drive cycles of the switched mode operation of the electronic switch 27*r*, and the average switch current 127*r* is the average of the current through the switch 27*r* over one or more drive cycles of the switched mode operation of the electronic switch 27*r*. The second intermediate current Iz is the (negative) current received at the second intermediate node z. Equivalently, the magnitude of the second intermediate voltage Vz decreases, when the magnitude of the average second intermediate current Iz is lower than the average switch current 127*r*. In the following, unless stated otherwise, the second intermediate current Iz is the average of the second intermediate current Iz, and the average switch current 127*p* is the average of the switch current 127*p*

Figure 10:
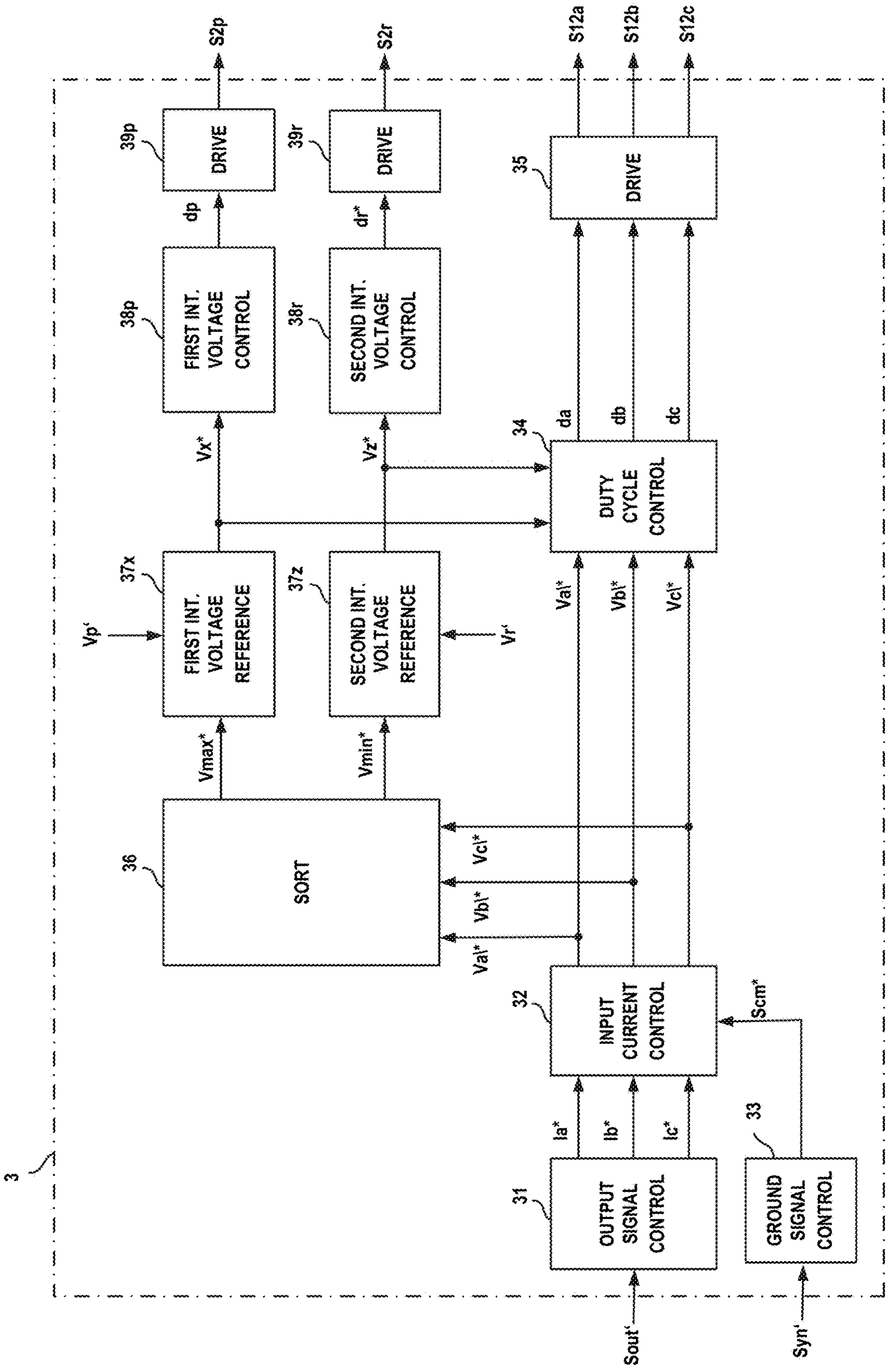
FIG. 10 illustrates a block diagram of the control circuit according to one example.

FIG. 10 illustrates a block diagram of the control circuit 3 according to one example. It should be noted that FIG. 10 illustrates the functionality of the control circuit 3 rather than a specific implementation. The control circuit 3 may be implemented in various ways. According to one example, the control circuit 3, which may include several control units 31-39*r*, can be implemented as a dedicated control circuit. According to another example, the control circuit 3 includes a microcontroller, wherein the different control units may be implemented as different program codes each configured to operate the microcontroller such that it has the functionality of the respective control unit.

Referring to FIG. 10, one of the control units of the control circuit number 3 is an output signal controller 31. The output signal controller 31 is configured to receive the measured output signal Sout' and provide input current references Ia*, Ib*, Ic*. Each of the input current references Ia*, Ib*, Ic* represents a desired current level of an average of a respective one of the input currents Ia, Ib, Ic. As detailed before, the average of an input current Ia, Ib, Ic is the average of the current over one or more drive cycles of the switched mode operation of the converter stage 10*a*, 10*b*, 10*c* receiving the respective input current Ia, Ib, Ic.

Referring to FIG. 10, another control unit of the control circuit 3 is a ground signal controller 33. The ground signal controller receives the measured ground signal Syn' and outputs a ground control signal Scm*.

Referring to FIG. 10, an input current controller 32 receives the input current references Ia*, Ib*, Ic* and the ground control signal Scm* and is configured to output the switched node voltage references Va*, Vb*, Vc* for controlling the input currents Ia, Ib, Ic dependent on the input current references Ia*, Ib*, Ic* and the ground control signal Scm*.

A duty cycle controller 34 receives the switched node voltage references Va*, Vb*, Vc* from the input current controllers 32, a first intermediate voltage reference Vx* from a first intermediate voltage reference controller 37*x*, and a second intermediate voltage reference Vz* from a second intermediate voltage reference controller 37*z*. The duty cycle controller 34 is configured to calculate duty cycles da, db, dc for operating the converter stages 10*a*, 10*b*, 10*c* of the first power converter 1 dependent on the switched node voltage references Va*, Vb*, Vc* and the first and second intermediate voltage references Vx*, Vz*.

Basically, calculating each of the duty cycles da, db, dc may include dividing the respective switched node voltage reference Va*, Vb*, Vc* by one of the first and second intermediate voltage references Vx*, Vz*. In particular, calculating each of the duty cycles da, db, dc may include dividing the respective switched node voltage reference Va*, Vb*, Vc* by the first intermediate voltage references Vx* when the respective switched node voltage is positive Va*, Vb*, Vc*, and dividing the respective switched node voltage reference Va*, Vb*, Vc* by the second intermediate voltage references Vz* when the respective switched node voltage is negative Va*, Vb*, Vc*. This is explained in the following with reference to calculating the duty cycle da of the first converter stage 10*a* based on the switched node voltage reference Va*\ associated with the first converter stage 10*a* and the first and second intermediate voltage references Vx*, Vz*. The duty cycles db, dc of the converter stages 10*b*, 10*c* are obtained by the duty cycle controller 34 in an equivalent way.

Figure 6:
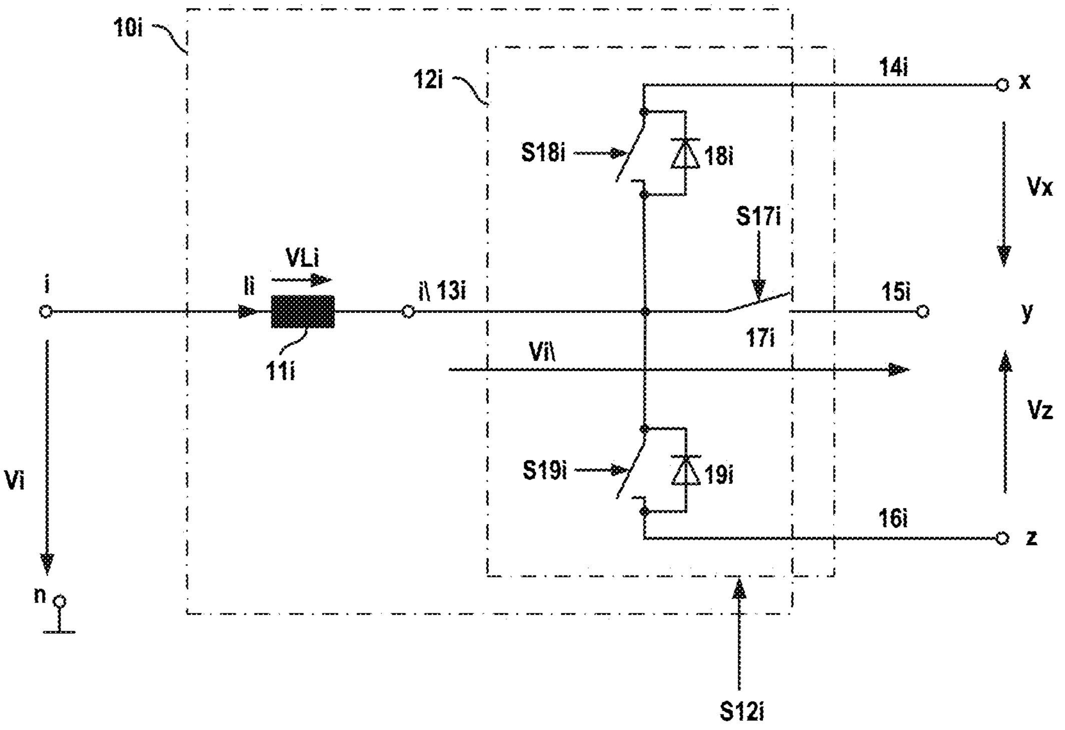

It should be noted that "a duty cycle" da, db, dc as briefly used herein denotes a duty cycle information, which is the information required by a drive circuit to drive an electronic switch, such as switch 17*i* in FIGS. 5 and 6, such that the switch is operated at the given duty cycle within one drive cycle.

The duty cycle controller 34 is configured to calculate the duty cycle da based on $$da = \frac{Va\backslash^*}{Vx^*} \qquad (6a)$$

when the switched node voltage reference Va*\ is positive. In this example, during the off-state of the electronic switch (17*i* in FIGS. 5 and 6) in the switching circuit 12*a* (see FIG. 4) the first rectifier element (18*i* in FIGS. 5 and 6) clamps the switched node to the first intermediate node x. Furthermore, the duty cycle controller 34 is configured to calculate the duty cycle da based on $$da = \frac{Va\backslash^*}{Vz^*} \qquad (7a)$$

when the switched node voltage reference Va*\ is negative. In this example, during the off-state of the electronic switch (17*i* in FIGS. 5 and 6) in the switching circuit 12*a* (see FIG. 4) the first rectifier element (18*i* in FIGS. 5 and 6) clamps the switched node to the second intermediate node z. In the example explained herein before, the second intermediate voltage Vz is negative. Thus, also the intermediate voltage reference Vz* is negative, so that calculating the duty cycle da based on equation (6*b*) results in a positive duty cycle value.

Equivalently, duty cycles db, dc are calculated based on $$db = \frac{Vb\backslash^*}{Vx^*} \qquad (6b)$$

$$dc = \frac{Vc\backslash^*}{Vx^*} \qquad (6c)$$

when the respective switched node voltage reference Vb*, Vc*\ is negative and based on $$db = \frac{Vb\backslash^*}{Vz^*} \qquad (7b)$$

$$dc = \frac{Vc\backslash^*}{Vz^*} \qquad (7c)$$

when the respective switched node voltage reference Vb*, Vc*\ is positive.

Referring to FIG. 10, a drive circuit 35 receives the duty cycles da, db, dc from the duty cycle controller 34 and is configured to generate the control signals S12*a*, S12*b*, S12*c* received by the converter stages 10*a*, 10*b*, 10*c* based on the duty cycles da, db, dc. In particular, drive circuit 35 is configured to drive the electronic switch in the switching circuit 12*a* of converter stage 10*a* in accordance with the duty cycle da, the electronic switch in the switching circuit 12*b* of converter stage 10*b* in accordance with the duty cycle db, and the electronic switch in the switching circuit 12*c* of converter stage 10*c* in accordance with the duty cycle dc.

The output signal controller 31, the input current controller 32, the ground signal controller 33, and the duty cycle controller 34 form an input power controller for controlling the input power received by the first power converter 1.

Referring to FIG. 10, the control circuit 3 further includes a sorter 36 that is configured to receive the switched node voltage references Va*\, Vb*\, Vc*\ from the input current controllers 32 and is configured to output a maximum switched node voltage reference Vmax* and a minimum switched node voltage reference Vmin*. The maximum switched node voltage reference Vmax* is the highest one of the switched node voltage references Va*\, Vb*\, Vc*\. That is, the maximum switched node voltage reference Vmax* is the most positive one of the switched node voltage references Va*\, Vb*\, Vc*\. The minimum switched node voltage reference Vmin* is the lowest one of the switched node voltage references Va*\, Vb*\, Vc*\. That is, the minimum switched node voltage reference Vmin* is the most negative one of the switched node voltage references Va*\, Vb*\, Vc*1.

Referring to the above, each of the switched node voltage references Va*\, Vb*\, Vc*\ follows the respective input voltage Va, Vb, Vc. Thus, in an input voltage system that includes three alternating input voltages of the type illustrated in FIG. 2, at each time, at least one of the three input voltages Va, Vb, Vc is positive and at least one of the three input voltages Va, Vb, Vc is negative. Thus, except for negligible time instances at which two voltages cross, there is a maximum (most positive) input voltage and a minimum (most negative) input voltage at each time. Consequently, at each time, there is a maximum (most positive) switched node voltage reference Vmax* and a minimum (most negative) switched node voltage reference Vmin*.

Referring to FIG. 10, the first intermediate voltage reference controller 37$x$ receives the maximum switched node voltage reference Vmax* and provides the first intermediate voltage reference Vx*, and the second intermediate voltage reference controller 37$z$ receives the minimum switched node voltage reference Vmin* and provides the second intermediate voltage reference Vz*. In the first operating mode of the power converter arrangement, the first intermediate voltage reference controller 37$x$ outputs the maximum switched node voltage reference Vmax* as the first intermediate voltage reference Vx*, and the second intermediate voltage reference controller 37$z$ outputs the minimum switched node voltage reference Vmin* as the second intermediate voltage reference Vz*.

Thus obtaining the duty cycles da, db, dc based on equations (6$a$)-(7$c$), in the first operating mode, has the effect that two of the three duty cycles equal 1, so that the electronic switch (17$i$ in FIGS. 5 and 6) is switched off throughout a respective drive cycle. Consequently, in a converter stage that includes a switching circuit with active rectifier elements, such as a switching circuit 12$i$ of the type illustrated in FIG. 6, the electronic switch included in 1 of the 2 active rectifier elements is switched on throughout a respective drive cycle.

It should be noted that the duration for which a certain one of switched node voltage references Va*\, Vb*\, Vc*\ is the maximum switched node voltage reference Vmax* is much longer than the duration of one drive cycle of the respective converter stage 10$a$, 10$b$, 10$c$. Thus, in the respective converter stage 10$a$, 10$b$, 10$c$, the electronic switch is in the off-state and the electronic switch of a corresponding active rectifier element is in the on-state for a duration much longer than the duration of one drive cycle. Thus, the respective converter stage 10$a$, 10$b$, 10$c$ is statically operated for a duration much longer than the duration of one drive cycle, which saves switching losses.

Equivalently, the duration for which a certain one of the switched node voltage references Va*\, Vb*\, Vc*\ is the minimum switched node voltage reference Vmin* is much longer than the duration of one drive cycle of the respective converter stage 10$a$, 10$b$, 10$c$. Thus, in the respective converter stage 10$a$, 10$b$, 10$c$, the electronic switch is in the off-state and the electronic switch of a corresponding active rectifier element is in the on-state for a duration much longer than the duration of one drive cycle. Thus, the respective converter stage 10$a$, 10$b$, 10$c$ is statically operated for a duration much longer than the duration of one drive cycle, which saves switching losses.

Thus, in the first operating mode of the power converter arrangement, at each time, there are two converter stages 10$a$, 10$b$, 10$c$ that are statically operated, while only one of the converter stages operates in the switched-mode. Such operation is possible, because the second power converter adjusts the first and second switched node voltages Vx, Vz in accordance with the maximum switched node voltage reference and the minimum switched node voltage reference Vmax*, Vmin*.

For controlling the first switched node voltage Vx, the control circuit 3 according to FIG. 10 includes a first intermediate voltage controller 38$p$ that receives the first intermediate voltage reference Vx* and generates a first duty cycle dp for operating the first converter stage 2$p$. A first drive circuit 39$p$ receives the first duty cycle dp and generates the control signal S2$p$ for operating the first converter stage 2$p$ based on the duty cycle dp. In particular, the control signal S2$p$ controls operation of the electronic switch 27$p$ in the first converter stage 2$p$.

For controlling the second switched node voltage Vz, the control circuit 3 according to FIG. 10 includes a second intermediate voltage controller 38$r$ that receives the second intermediate voltage reference Vz* and generates a first duty cycle dr for operating the second converter stage 2$p$. A second drive circuit 39$p$ receives the second duty cycle dr and generates the control signal S2$r$ for operating the second converter stage 2$r$ based on the duty cycle dr. In particular, the control signal S2$r$ controls operation of the electronic switch 27$r$ in the second converter stage 2$r$.

Detailed examples of some of the control units 31-39$r$ included in the control circuit 3 according to FIG. 10 are illustrated and explained in the following.

Figure 11:
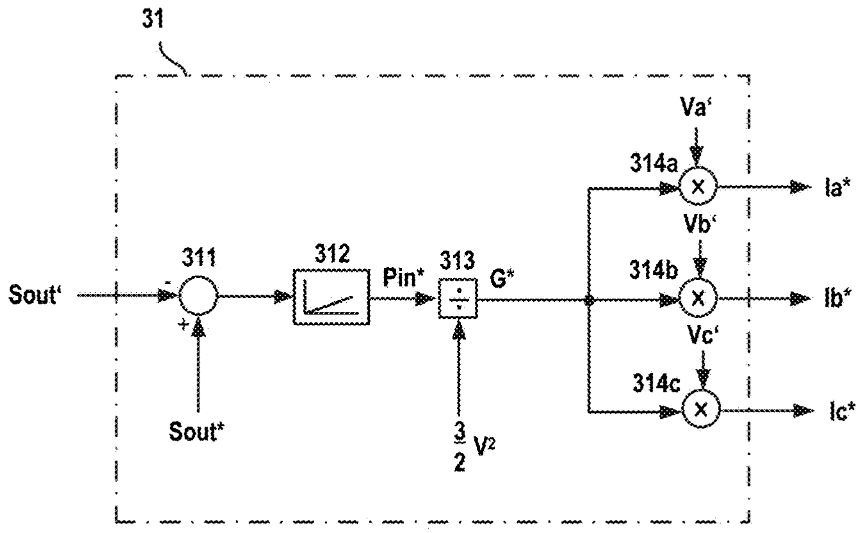
FIG. 11 illustrates one example of an output signal controller included in the control circuit according to FIG. 10.

FIG. 11 illustrates one example of the output signal controller 31 that receives the measured output signal Sout' and provides the input current references Ia*, Ib*, Ic*. Referring to FIG. 11, the output signal controller 31 generates a conductance reference G*, which represents a desired input conductance of the first power converter 1. Each of the input current references Each of the input current references Ia*, Ib*, Ic* is generated by multiplying the conductor current reference G* by a respective measured input voltage Va', Vb', Vc' using a respective multiplier 314$a$, 314$b$, 314$c$. In this way, each of the input current references Ia*, Ib*, Ic* is proportional to the respective input voltage Va, Vb, Vc so that a PFC functionality is achieved. Each of the measured input voltages Va', Vb', Vc' represents the respective input voltage Va, Vb, Vc and can be obtained by measuring the input voltage Va, Vb, Vc using a conventional voltage measurement circuit (not illustrated).

Referring to FIG. 11, calculating the conductance reference G* includes subtracting, by a subtractor 311, the measured output signal Sout' from an output signal reference Sout*. The output signal reference Sout* represents the desired signal level of the output signal that is to be regulated (the output voltage Vout or the output current Iout, for example). An output signal of the subtractor is an error signal that represents a difference between the signal level of the desired output signal and the signal level of the existing (measured) output signal Sout'. A controller such as, for example, a PI (proportional-integral) controller receives the error signal and outputs a signal Pin* that represents a desired (average) input power. The average input power is the input power over at least one drive cycle of the switched mode operation of the first power converter 1. In the example explained herein before, in which the input voltages are sinusoidal input voltages and, due to the PFC functionality of the first power converter 1, the input currents Ia, Ib, Ic are sinusoidal input currents, the input power at each of the three inputs a, b, c has a sine squared waveform. Due to the phase shift (120°) between the input voltages Va, Vb, Vc and a corresponding phase shift between the input currents Ia, Ib, Ic the overall input power Pin is essentially constant. Consequently, the input power reference Pin* is essentially constant.

Referring to FIG. 11, the input power reference Pin* is divided by $3/2V^2$ by a divider 313 in order to obtain the conductance reference G*, where V denotes the amplitude of the input voltages Va, Vb, Vc. The amplitude is given by $\sqrt{2}$ times the RMS value explained above.

Figure 12:
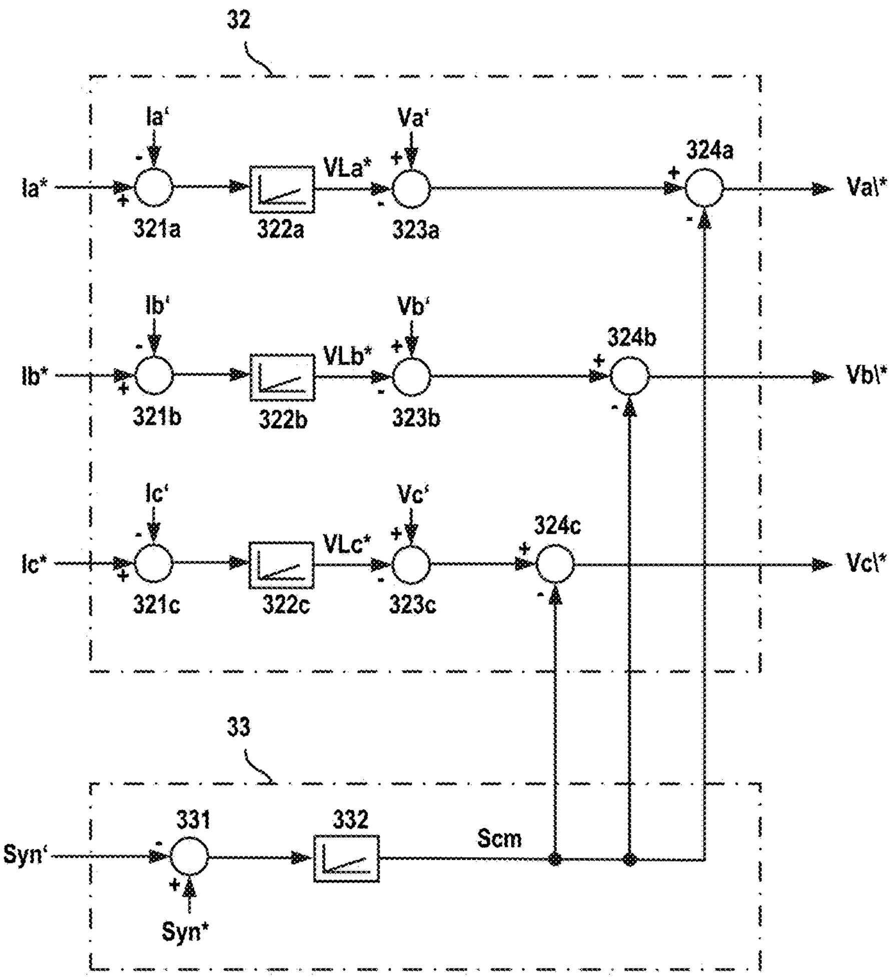
FIG. 12 illustrates examples of a ground signal controller and an input current controller included in the control circuit according to FIG. 10.

FIG. 12 illustrates one example of the input current controller 32 and the grounded signal controller 33. The current controller 32 according to FIG. 12 includes three controller branches, wherein each of these controller branches is configured to provide one of the three switched node voltage references Va*, Vb*, Vc*. In the following, a first controller branch that is configured to generate the switched node voltage Va* based on the input current reference Ia* and the ground control signal Scm* is briefly explained in the following. The other two controller branches are implemented and operated in the same way. In the three controller branches, corresponding parts are labeled with corresponding reference signs. "Corresponding reference signs" are reference signs that have the same and that are different by added character "a" in the first controller branch, "b" in a controller branch, and "c" in a third controller branch.

Referring to FIG. 12, the first controller branch includes an adder 321*a* that subtracts a measured input current Ia' from the input current reference Ia* to obtain an input current error. The measured input current Ia' represents the (average) input current Ia and may be obtained by measuring the input current Ia using conventional current measurement circuit (not illustrated) and low pass filtering the measured values in order to obtain the average of the input current Ia over at least one drive cycle. A controller 322*a*, such as a PI controller, generates an inductor voltage reference VLa* based on the input current error. The inductor voltage reference VLa* represents the desired average voltage across the inductor 11*a* in the first converter stage 10*a*. The inductor voltage reference VLa* represents the inductor voltage that is required to achieve that the first input current Ia at least approximately equals the first input current reference Ia*. The switched node voltage Va* reference is given by the measured first input voltage Va' minus the inductor voltage reference VLa* and minus the ground signal Scm* and is provided by a subtractor 324.

As can be seen from FIG. 11, the ground signal Scm* affects each of the input voltage references Va*, Vb*, Vc* in the same way. That is, each of the input voltage references Va*, Vb*, Vc* changes in the same way when the ground signal Scm* changes. The ground signal Scm* may therefore also be referred to as common mode signal.

Referring to FIG. 12, the ground signal Scm can be obtained by subtracting the measured ground signal Syn' from a ground signal reference Syn* by a subtractor 331. According to one example, the ground signal reference Syn* is zero, Syn*=0, so that a voltage or a current between the first and second ground nodes n, y is zero. An output signal of the subtractor 331 represents a difference between the ground signal reference Syn* and the measured ground signal Syn'. This output signal is received by a controller 332, such as a PI controller, which outputs the ground signal Scm based on the subtractor 331 output signal.

Figure 13:
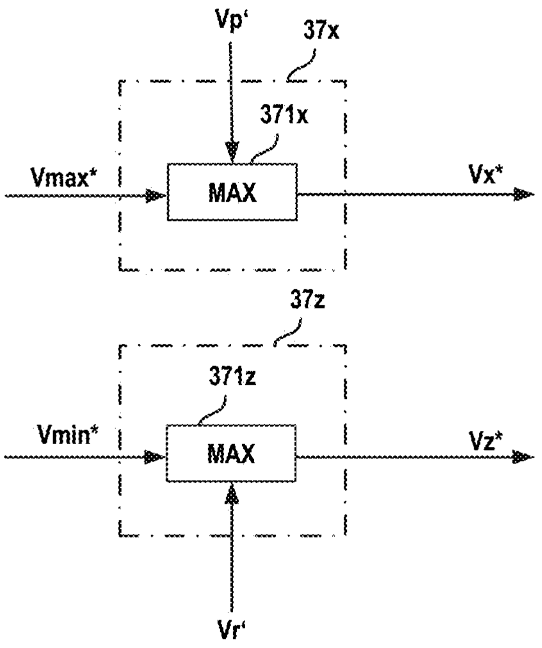
FIG. 13 illustrates examples of first and second intermediate voltage reference controllers included in the control circuit according to FIG. 10.

FIG. 13 illustrates examples of the first and second intermediate voltage reference controllers 37*x*, 37*z*. In this example, each of the first and second intermediate voltage reference controllers 37*x*, 37*z* includes a maximum selector 371*x*, 371*z* that is configured to receive two signals, detect which one of the two signals has the higher magnitude, and output the signal having the higher magnitude.

Referring to FIG. 13, the maximum selector 371*x* included in the first intermediate voltage reference controller 37*x* receives the maximum switched node voltage reference Vmax* and the measured first output voltage portion Vp'. According to one example, both the maximum switched node voltage reference Vmax* and the measured first output voltage portion Vp' are positive, so that the maximum selector 371*x* outputs the more positive one of these two signals (values).

Referring to FIG. 13, the maximum selector 372*z* included in the second intermediate voltage reference controller 37*z* receives the minimum switched node voltage reference Vmin* and the measured second output voltage portion Vr'. According to one example, both the minimum switched node voltage reference Vmin* and the measured second output voltage portion Vr' are negative, so that the maximum selector 371*z* outputs the more negative one of these two signals (values).

Referring to the above, in the first operating mode of the power converter arrangement, the first intermediate voltage reference Vx* equals the maximum switched node voltage reference Vmax* and the second intermediate voltage reference Vz* equals the minimum switched node voltage reference Vmin*. Thus, considering the functionality of the first and second intermediate voltage reference controllers 37*x*, 37*z*, the power converter arrangement operates in the first operating mode when the maximum switched node voltage reference Vmax* is higher (more positive) than the measured first output voltage portion Vp' and when the minimum switched node voltage reference Vmin* is lower (more negative) than the measured second output voltage portion Vr'.

Figure 14:
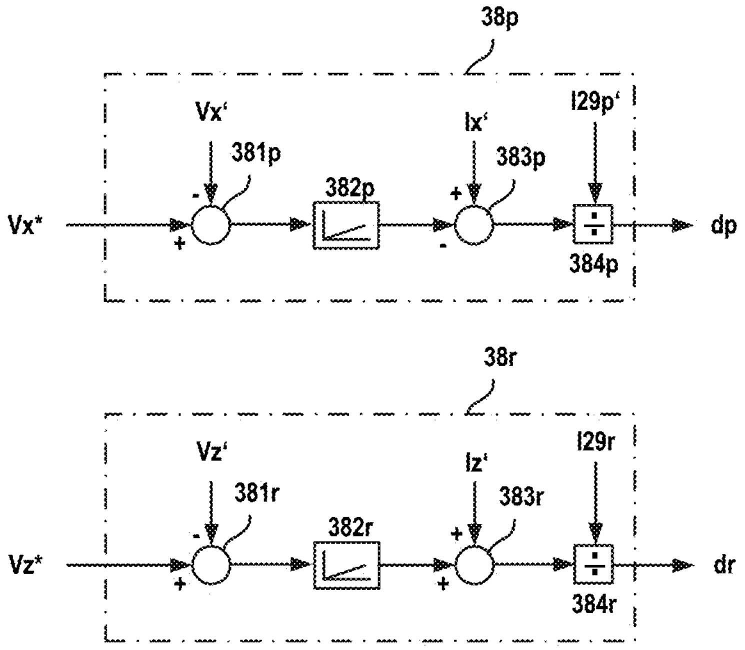
FIG. 14 illustrates examples of the first and second intermediate voltage controllers included in the control circuit according to FIG. 10.

FIG. 14 illustrates examples of the first and second intermediate voltage controllers 38*p*, 38*r*. As explained above, the first intermediate voltage controller 38*p* receives the first intermediate voltage reference Vx* and generates the duty cycle dp for operating the electronic switch 27*p* in the first converter stage 2*p* of the second power converter 2. The second intermediate voltage controller 38*r* receives the second intermediate voltage reference Vz* and generates the duty cycle dr for operating the electronic switch 27*r* in the second converter stage 2*r* of the second power converter 2. The first and second intermediate voltage controllers 38*p*, 38*r* are implemented in the same way, wherein corresponding parts have corresponding reference numbers. "Corresponding reference numbers" reference numbers that have the same numeral and an added "p" in the case of the first intermediate voltage controller 38*p* and an added "r" in the case of the second intermediate voltage controller 38*r*. In the following, the first intermediate voltage controllers 38*p* and its functionality is explained in detail. This explanation applies to the second intermediate voltage controller 38*r* accordingly.

Referring to FIG. 14, the first intermediate voltage controllers 38*p* includes a subtractor 381*p* that subtracts the first intermediate voltage reference Vx* from the measured first intermediate voltage Vx'. The measured first intermediate voltage Vx' represents the first intermediate voltage Vx and may be obtained by measuring the first intermediate voltage Vx using a conventional mode voltage measurement circuit (not illustrated). An output signal of the subtractor 381*p*, which represents a difference between the first intermediate voltage reference Vx* and the measured first intermediate voltage Vx', is received by a controller 382*p*, which is a PI controller, for example. A further subtractor 383*p* subtracts an output signal of the controller 382*p* from the first (average) intermediate current Ix'. The first (average) intermediate current Ix' may be measured using a current sensor, may be calculated based on the measured input currents Ia', Ib', Ic, or may be calculated based on the duty cycles da, db, dc of the three converter stages 10*a*, 10*b*, 10*c*. The first (average) intermediate current is a feedforward signal in the control loop illustrated in FIG. 14. The average of the intermediate current Ix is the average over one or more drive cycles of the switched-mode operation of the first power converter 1.

Referring to FIG. 14, a divider 384*p* divides an output signal of the subtractor 383*p* by the measured first inductor current 129*p*', which represents the current through the inductor 29*p*.

The first intermediate voltage controller 38*p* illustrated in FIG. 14 is configured to control operation of the first converter stage 2*p* taking into account the first intermediate voltage reference Vx*, the measured first intermediate voltage Vx', and the measured first intermediate current Ix' such that the first intermediate voltage Vx at least approximately equals the first intermediate voltage reference Vx*, so that the first intermediate voltage Vx tracks the first intermediate voltage reference Vx*. Equivalently, the second intermediate voltage controller 38*r* illustrated in FIG. 14 is configured to control operation of the second converter stage 2*r* taking into account the second intermediate voltage reference Vz*, the measured second intermediate voltage Vz', and the measured second intermediate current Iz' such that the second intermediate voltage Vz at least approximately equals the second intermediate voltage reference Vz*, so that the second intermediate voltage Vz tracks the second intermediate voltage reference Vz*.

Instead of a subtractor, such as subtractor 383*p* in the first intermediate voltage controller, the second intermediate voltage controller 38*r* includes an adder 383*r* that adds an output signal of controller 382*r* to the second (average) intermediate current Iz'. A divider 384*r* divides an output signal of the adder 383*r* by the measured second inductor current 129*p*'.

Referring to FIG. 10, in the event that the measured first output voltage portion Vp' is higher than the maximum switched node voltage reference Vmax*, the first intermediate voltage reference Vx* equals the measured first output voltage portion Vp'. In this case, the first intermediate voltage controller 38*p* controls the first intermediate voltage Vx to be essentially equal to the first output voltage portion Vp', which includes that the duty cycle dp is generated by the first intermediate voltage controller 38*r* to be equal to 1, dp=1, so that the switch 27*p* is permanently switched on.

Equivalently, in the event that the magnitude of the measured second output voltage Vr' is higher than the magnitude of the minimum switched node voltage reference, the second intermediate voltage Vz* equals the measured second output voltage portion Vr'. In this case, the second intermediate voltage controller 38*r* controls the second intermediate voltage Vz to be essentially equal to the second output voltage portion Vr, which includes that the duty cycle dr is generated by the second intermediate voltage controller 38*r* to be equal to 1, dr=1, so that the switch 27*r* is permanently the switched on.

Figure 15:
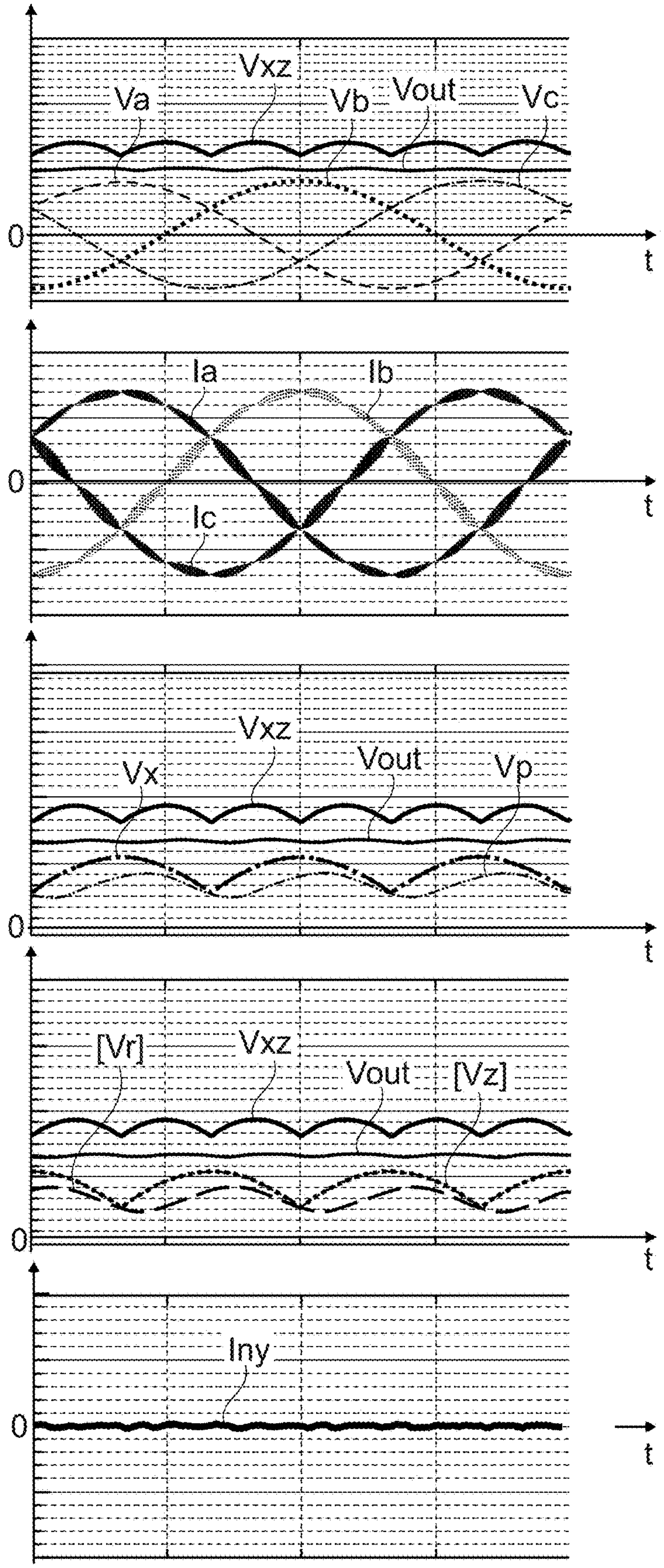
FIG. 15 shows signal diagrams that illustrate operating the power converter arrangement in a first operating mode.

FIG. 15 shows signal diagrams that illustrate operating the power converter arrangement in the first operating mode. More specifically, FIG. 15 shows signal diagrams, over one period of the input voltages Va, Vb, Vc, of the input voltages Va, Vb, Vc; the input currents Ia, Ib, Ic; the output voltage Vout; the first intermediate voltage Vx and the first output voltage portion Vp; magnitudes of the second intermediate voltage Vz and the second output voltage portion Vr (both voltages Vz, Vr are negative in the examples explained before); an overall DC link voltage Vxz, which is the voltage between the first and second intermediate nodes x, z; and the ground current Iyn. As can be seen from FIG. 15, each of the input currents Ia, Ib, Ic has the same waveform as the corresponding input voltage Va, Vb, Vc, so that the power converter arrangement has a PFC functionality. FIG. 15 illustrates the instantaneous input currents Ia, Ib, Ic which include high frequent variations due to the switched mode operation of the first power converter 1.

Referring to the above, in the first operating mode of the power converter arrangement, the first intermediate voltage Vx is regulated by the first converter stage 2*p* in the second power converter 2 such that the first intermediate voltage Vx at least approximately equals the maximum switched node voltage reference Vmax*.

Furthermore, as explained above, each of the switched node voltage references Va*, Vb*, Vc* is similar to the respective input voltage Va, Vb, Vc. Thus, in those time periods in which the first input voltage Va is the maximum input voltage, that is, the most positive one of the input voltages Va, Vb, Vc, the first intermediate voltage Vx essentially follows the first input voltage Va. Equivalently, in those time periods in which the second input voltage Vb is the maximum input voltage the first intermediate voltage Vx essentially follows the second input voltage Vb; and in those time periods in which the third input voltage Vc is the maximum input voltage the first intermediate voltage Vx essentially follows the third input voltage Vc. As can be seen from FIG. 15, over one third of one period of the input voltages Va, Vb, Vc each of the input voltages Va, Vb, Vc is the maximum input voltage, so that the first intermediate voltage Vx has a three-pulse waveform.

Equivalently, in those time periods in which the first input voltage Va is the minimum input voltage, that is, the most negative one of the input voltages Va, Vb, Vc, the second intermediate voltage Vz essentially follows the first input voltage Va. Equivalently, in those time periods in which the second input voltage Vb is the minimum input voltage the second intermediate voltage Vz essentially follows the second input voltage Vb; and in those time periods in which the third input voltage Vc is the minimum input voltage the second intermediate voltage Vz essentially follows the third input voltage Vc. As can be seen from FIG. 15, over one third of one period of the input voltages Va, Vb, Vc each of the input voltages Va, Vb, Vc is the minimum input voltage, so that the second intermediate voltage Vz also has a three-pulse waveform. There is a phase shift between the three-pulse shape waveform of the first and second intermediate voltages Vx, Vz, so that the overall intermediate voltage (overall DC link voltage) Vxz has a six-pulse waveform.

As can be seen from FIG. 15, in the first operating mode, the first output voltage portion Vp is lower than the first intermediate voltage Vx, and the magnitude of the second output voltage portion Vr is lower than the magnitude of the second intermediate voltage Vz, so that the power converter arrangement operates in the first operating mode.

According to one example, the power converter arrangement is also capable of operating in a second operating mode. The power converter arrangement operates in the second operating mode when the first output voltage portion Vp is higher than the maximum switched node voltage reference Vmax* and the magnitude of the second output voltage portion Vr is higher than the magnitude of the minimum switched node voltage reference Vmin*. In this case, the first intermediate voltage reference controller 37*x* illustrated in FIG. 10 outputs the measured first output voltage portion Vp' as the first intermediate voltage reference Vx* and the second intermediate voltage reference controller 37*z* outputs the measured second output voltage portion Vr' as the second intermediate voltage reference Vz*. In this operating mode, each of the three converter stages 10*a*, 10*b*, 10*c* operates in the switched mode, so that an operating mode of the first power converter 1 may be referred to as 3/3 mode.

In the second operating mode the first and second converter stages 2*p*, 2*r* of the second power converter 2 can be deactivated in such a way that the switches 27*p*, 27*r* in each of the first and second converter stages 2*p*, 2*r* are switched on permanently. In this operating mode, the output voltage Vout and the overall DC link voltage Vxz is only regulated by operating the first power converter 1.

Figure 16:
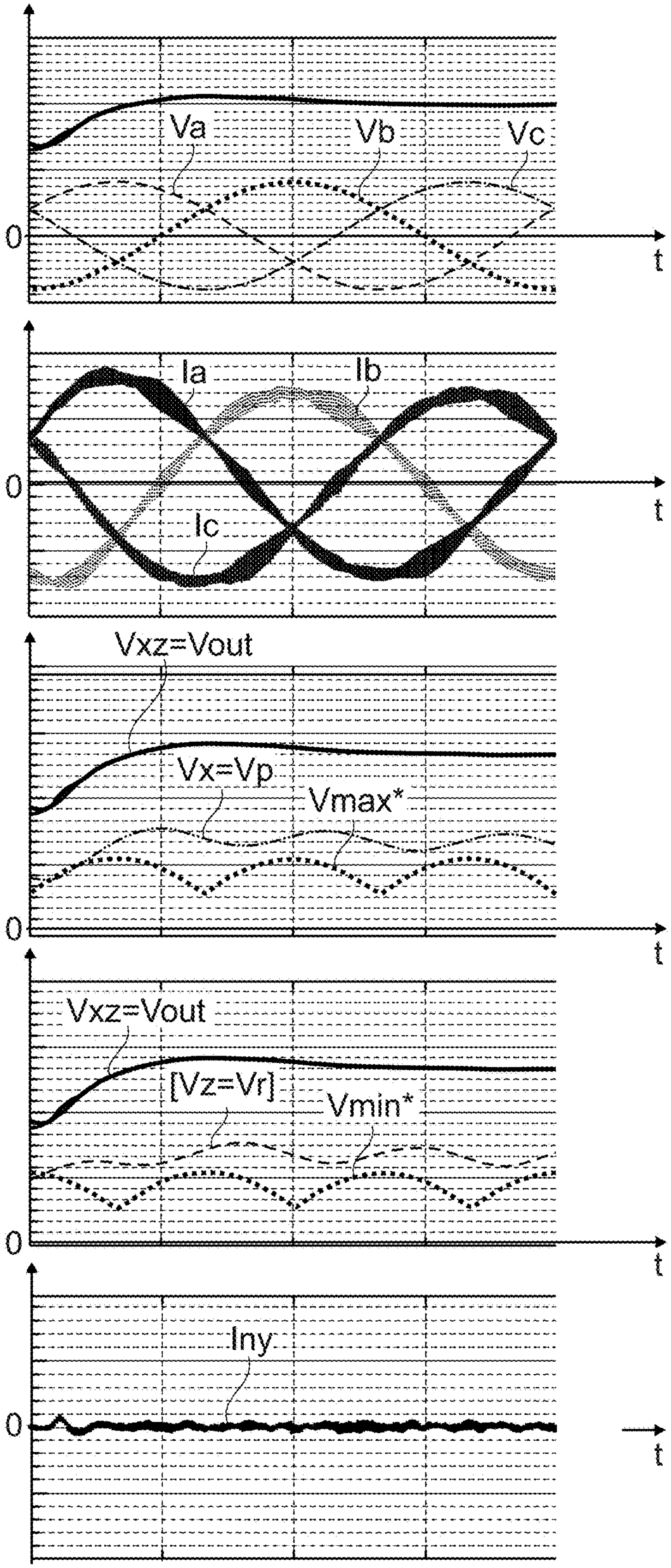
FIG. 16 shows signal diagrams that illustrate operating the power converter arrangement in a second operating mode.

FIG. 16 shows signal diagrams that illustrate operating the power converter arrangement in the second operating mode. More specifically, FIG. 16 shows signal diagrams, over one period of the input voltages Va, Vb, Vc, of the input voltages Va, Vb, Vc; the input currents Ia, Ib, Ic; the output voltage Vout that equals the overall DC link voltage Vxz; the first intermediate voltage Vx that equals the first output voltage portion Vp; magnitudes of the second intermediate voltage Vz and the second output voltage portion Vr that are equal; the maximum switched node voltage reference Vmax*; the magnitude of the minimum switched node voltage reference Vmin*; and the ground current Iyn. As can be seen from FIG. 15, each of the input currents Ia, Ib, Ic has the same waveform as the corresponding input voltage Va, Vb, Vc, so that the power converter arrangement has a PFC functionality. In this operating mode, as can be seen from FIG. 16, the first and second intermediate voltages Vx, Vz and the first and second output voltage portions Vp, Vr vary as a result of regulating the ground current Iyn or the ground voltage Vyn to be zero.

Figure 17:
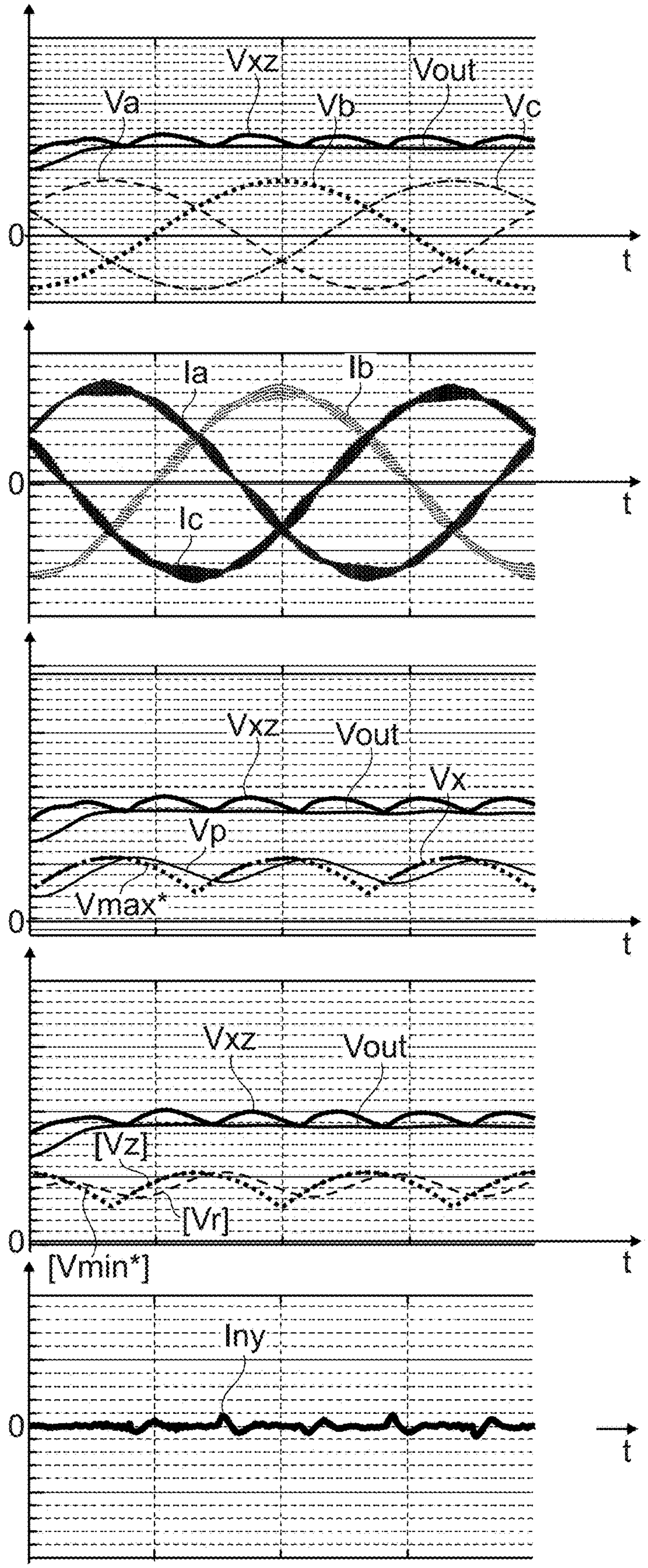
FIG. 17 shows signal diagrams that illustrate operating the power converter in a transition phase between the first and second operating modes.

When the output voltage increases from a voltage level in which the power converter arrangement operates in the first operating mode to a voltage level in which the power converter arrangement operates in the second operating mode there may be a transition phase. Operating the power converter arrangement in this transition phase is illustrated by the signal diagrams illustrated in FIG. 17.

In the transition phase, there are time periods in which the first output voltage portion Vp is lower than the maximum switched node voltage reference Vmax*, so that the first intermediate voltage Vx is regulated by the second power converter 2 to be essentially equal to the maximum switched node voltage reference Vmax*.

Furthermore, in the transition phase, there are time periods in which the first output voltage portion Vp is higher than the maximum switched node voltage reference Vmax*, so that the second power converter number 2 is the deactivated and the first intermediate voltage Vx equals the first output voltage portion Vp.

In the transition phase, there are also time periods in which the magnitude of the second output voltage portion Vr is lower than the magnitude of the minimum switched node voltage reference Vmin*, so that the second intermediate voltage Vz is regulated by the second power converter 2 to be essentially equal to the minimum switched node voltage reference Vmin*. Furthermore, in the transition phase there are time periods in which the magnitude of the second output voltage portion Vr is higher than the magnitude of the minimum switched node voltage reference Vmin*, so that the second power converter 2 is the actuated and the second intermediate voltage Vz equals the second output voltage portion Vr.

In the transition phase of the power converter arrangement, at each time, one of the three converter stages 10*a*, 10*b*, 10*c* is statically operated. The operating mode of the first power converter 1 in the transition phase may therefore be referred to as 2/3 mode.

Some of the aspects explained above are briefly summarized in the following with reference to numbered examples.

Example 1. A method, including: operating a power converter arrangement in a first operating mode, wherein the power converter arrangement includes: a first power converter including input nodes each configured to receive a respective one of input voltages each referenced to a first ground node, and configured to provide first and second intermediate voltages each referenced to a second ground node; a second power converter connected between the first power converter and an output of the power converter arrangement, and wherein operating the power converter arrangement in the first operating mode includes: adjusting an input power received by the first power converter from the input nodes dependent on an output signal and dependent on a ground signal, and adjusting each of the first and second intermediate voltages by the second power converter, wherein the ground signal is a signal between the first and second ground nodes, wherein adjusting the input power includes obtaining switched node voltage references dependent on the output signal and the ground signal, wherein adjusting the first intermediate voltage includes selecting a maximum switched node voltage reference of the obtained switched node voltage references and adjusting the first intermediate voltage such that the first intermediate voltage tracks the maximum switched node voltage reference, and wherein adjusting the second intermediate voltage includes selecting a minimum switched node voltage reference of the obtained switched node voltage references and adjusting the second intermediate voltage such that the second intermediate voltage tracks the minimum of the obtained switched node voltage references.

Example 2. The method of example 1, wherein an output voltage having a first output voltage portion and a second output voltage portion is available at the output, and wherein in the first operating mode a magnitude of the first output voltage portion is lower than a magnitude of the maximum switched node voltage reference and a magnitude of the second output voltage portion is lower than a magnitude of the minimum switched node voltage reference.

Example 3. The method of example 2, further including: operating the power converter arrangement in a second operating mode when the magnitude of the first output voltage portion is higher than the magnitude of the maximum switched node voltage reference and the magnitude of the second output voltage portion is higher than the magnitude of the minimum switched node voltage reference, wherein operating the power converter arrangement in the second operating mode includes: deactivating the second power converter.

Example 4. The method of any one of examples 1 to 3, wherein the output signal is an output current of the power converter arrangement.

Example 5. The method of any one of examples 1 to 3, wherein the output signal is an output voltage of the power converter arrangement.

Example 6. The method of any one of examples 1 to 5, wherein the ground signal is a voltage between the first and second ground nodes.

Example 7. The method of any one of examples 1 to 5, wherein the ground signal is a current between the first and second ground nodes.

Example 8. The method of any one of the preceding examples, wherein the second power converter includes a first converter stage and a second converter stage, and wherein adjusting each of the first and second intermediate voltages by the second power converter includes adjusting the first intermediate voltage by the first converter stage and adjusting the second intermediate voltage by the second converter stage.

Example 9. The method of example 8, wherein each of the first and second converter stages includes a buck converter.

Example 10. The method of any one of the preceding examples, wherein the first power converter includes converter stages each coupled to a respective one of the input nodes and each including a switched node between an inductor and a switching stage, wherein each of the switched node voltage references is a desired voltage between the switched node of a respective one of the converter stages and the first or second ground node.

Example 11. A controller configured to operate a power converter arrangement in a first operating mode, wherein the power converter arrangement includes: a first power converter including input nodes each configured to receive a respective one of input voltages each referenced to a first ground node, and configured to provide first and second intermediate voltages each referenced to a second ground node; a second power converter connected between the first power converter and an output of the power converter arrangement, and wherein to operate the power converter arrangement in the first operating mode includes: to adjust an input power received by the first power converter from the input nodes dependent on an output signal and dependent on a ground signal, and to adjust each of the first and second intermediate voltages by the second power converter, wherein the ground signal is a signal between the first and second ground nodes, wherein to adjust the input power received by the first power converter includes to obtain switched node voltage references dependent on the output signal and the ground signal, wherein to adjust the first intermediate voltage includes selecting a maximum switched node voltage reference of the obtained switched node voltage references and to adjust the first intermediate voltage such that the first intermediate voltage tracks the maximum switched node voltage reference, and wherein to adjust the second intermediate voltage includes to select a minimum switched node voltage reference of the obtained switched node voltage references and to adjust the second intermediate voltage such that the second intermediate voltage tracks the minimum of the obtained switched node voltage references.

Example 12. The controller of example 11, wherein an output voltage having a first output voltage portion and a second output voltage portion is available at the output, and wherein to operate the power converter arrangement in the first operating mode includes to operate the power converter arrangement in the first operating mode when a magnitude of the first output voltage portion is lower than a magnitude of the maximum switched node voltage reference and a magnitude of the second output voltage portion is lower than a magnitude of the minimum switched node voltage reference.

Example 13. The controller of example 12, wherein the controller is further configured to operate the power converter arrangement in a second operating mode when the magnitude of the first output voltage portion is higher than the magnitude of the maximum switched node voltage reference and the magnitude of the second output voltage portion is higher than the magnitude of the minimum switched node voltage reference, wherein to operate the power converter arrangement in the second operating mode includes: to deactivate the second power converter.

Example 14. The controller of any one of examples 11 to 13, wherein the output signal is one of an output current and an output voltage of the power converter arrangement.

Example 15. A power converter arrangement, including: a first power converter including input nodes each configured to receive a respective one of input voltages each referenced to a first ground node, and configured to provide first and second intermediate voltages each referenced to a second ground node; a second power converter connected between the first power converter and an output of the power converter arrangement; and a controller according to any one of examples 11 to 14.

The invention claimed is:

1. A method comprising:

operating a power converter arrangement in a first operating mode, wherein the power converter arrangement comprises:

a first power converter (1) comprising input nodes (a, b, c), each of the input nodes configured to receive a respective one of input voltages (Va, Vb, Vc), each of the input voltages referenced to a first ground node (n), and the first power converter configured to provide first intermediate voltage (Vx) and second intermediate voltage (Vz) each of which are referenced to a second ground node (y);

a second power converter connected between the first power converter (1) and an output (p, r) of the power converter arrangement, and wherein operating the power converter arrangement in the first operating mode comprises:

adjusting an input power received by the first power converter (1) from the input nodes (a, b, c) dependent on an output signal (Sout) and dependent on a ground signal (Syn), and adjusting each of the first intermediate voltage (Vx) and the second intermediate voltage (Vz) by the second power converter (2), wherein the ground signal (Syn) is a signal between the first ground node (n) and the second ground node (y), wherein adjusting the input power comprises obtaining switched node voltage references (Va*, Vb*, Vc*) dependent on the output signal (Sout) and the ground signal (Syn), wherein adjusting the first intermediate voltage (Vx) comprises selecting a maximum switched node voltage reference (Vmax) of the obtained switched node voltage references (Va*, Vb*, Vc*) and adjusting the first intermediate voltage (Vx) such that the first intermediate voltage (Vx) tracks the maximum (Vmax) switched node voltage reference (Va*, Vb*, Vc*), and wherein adjusting the second intermediate voltage (Vz) comprises selecting a minimum switched node voltage reference (Vmin) of the obtained switched node voltage references (Va*, Vb*, Vc*) and adjusting the second intermediate voltage (Vz) such that the second intermediate voltage (Vz) tracks the minimum (Vmin) of the obtained switched node voltage references (Va*, Vb*, Vc*).

2. The method of claim 1, wherein an output voltage (Vout) having a first output voltage portion (Vp) and a second output voltage portion (Vr) is outputted from the output (p, r), and wherein in the first operating mode, a magnitude of the first output voltage portion (Vp) is lower than a magnitude of the maximum switched node voltage reference (Vmax) and a magnitude of the second output voltage portion (Vr) is lower than a magnitude of the minimum switched node voltage reference (Vmin).

3. The method of claim 2, further comprising:

operating the power converter arrangement in a second operating mode during a condition in which the magnitude of the first output voltage portion (Vp) is higher than the magnitude of the maximum switched node voltage reference (Vmax) and the magnitude of the second output voltage portion (Vr) is higher than the magnitude of the minimum switched node voltage reference (Vmin), wherein operating the power converter arrangement in the second operating mode further comprises:

deactivating the second power converter (2).

4. The method of claim 1, wherein the output signal (Sout) is an output current (Iout) of the power converter arrangement.

5. The method of claim 1, wherein the output signal (Sout) is an output voltage (Vout) of the power converter arrangement.

6. The method of claim 1, wherein the ground signal (Syn) is a voltage (Vyn) between the first ground node (n) and the second ground node (y).

7. The method of claim 1, wherein the ground signal (Syn) is a current (Iyn) between the first ground node (n) and the second ground node (y).

8. The method of claim 1, wherein the second power converter (2) comprises a first converter stage (20*p*) and a second converter stage (20*r*), and wherein adjusting each of the first intermediate voltage (Vx) and the second intermediate voltage (Vy) by the second power converter (2) comprises adjusting the first intermediate voltage (Vx) by the first converter stage (20*p*) and adjusting the second intermediate voltage (Vz) by the second converter stage (20*r*).

9. The method of claim 8, wherein each of the first converter stage (20*p*) and the second converter stage (20*r*) comprises a buck converter.

10. The method of claim 1, wherein the first power converter (1) comprises multiple converter stages (10*a*, 10*b*, 10*c*) each coupled to a respective one of the input nodes (a, b, c) and each comprising a switched node (al, bl, cl) between an inductor (11*a*, 11*b*, 11*c*) and a switching stage (12*a*, 12*b*, 12*c*), wherein each of the switched node voltage references (Va*, Vb*, Vc*) is a desired voltage between the switched node (al, bl, cl) of a respective one of the converter stages (10*a*, 10*b*, 10*c*) and the first or second ground node (n, y).

11. The method of claim 1, wherein the first ground node and the second ground node are not ohmically connected to each other.

12. The method of claim 1, wherein the first ground node and the second ground node are capacitively coupled to each other.

13. The method of claim 1, wherein the first ground node and the second ground node are ohmically connected to each other.

14. The method of claim 1, wherein the first ground node is galvanically isolated from the second ground node.

15. The method of claim 1 further comprising:

regulating a magnitude of the ground signal (Syn) with respect to a ground signal reference (Syn*).

16. The method of claim 15, wherein regulating the magnitude of the ground signal Syn includes:

adjusting the magnitude of the ground signal (Syn) to be equal to the ground signal reference (Syn*).

17. The method of claim 1, wherein adjusting the input power includes producing first control signals to control first switches in the first power converter (1) based on the output signal (Sout) and the ground signal (Syn); and wherein adjusting each of the first intermediate voltage (Vx) and the second intermediate voltage (Vy) includes producing second control signals to control second switches in the second power converter (2) based on the output signal (Sout) and the ground signal (Syn).

18. The method of claim 1, wherein a magnitude of an output voltage outputted from the output (p,r) is a summation of a first output voltage portion (Vp) and a second output voltage portion (Vr), the method further comprising:

operating the power converter arrangement in a second operating mode during a condition in which the magnitude of the first output voltage portion (Vp) is greater than a magnitude of the maximum switched node voltage reference (Vmax) and the magnitude of the second output voltage portion (Vr) is greater than a magnitude of the minimum switched node voltage reference (Vmin).

19. The method of claim 1, wherein adjusting each of the first intermediate voltage (Vx) and the second intermediate voltage (Vy) includes producing control signals to control switches in the second power converter (2) based on the output signal (Sout) and the ground signal (Syn).

20. A controller configured to operate a power converter arrangement in a first operating mode, wherein the power converter arrangement comprises:

a first power converter (1) comprising input nodes (a, b, c) each configured to receive a respective one of input voltages (Va, Vb, Vc) each referenced to a first ground node (n), and configured to provide first and second intermediate voltages (Vx, Vz) each referenced to a second ground node (y);

a second power converter connected between the first power converter (1) and an output (p, r) of the power converter arrangement, and wherein to operate the power converter arrangement in the first operating mode comprises:

to adjust an input power received by the first power converter (1) from the input nodes (a, b, c) dependent on an output signal (Sout) and dependent on a ground signal (Syn), and to adjust each of the first and second intermediate voltages (Vx, Vy) by the second power converter (2), wherein the ground signal (Syn) is a signal between the first ground node (n) and the second ground node (y), wherein to adjust the input power received by the first power converter (1) comprises to obtain switched node voltage references (Va*, Vb*, Vc*) dependent on the output signal (Sout) and the ground signal (Syn), wherein to adjust the first intermediate voltage (Vx) comprises selecting a maximum switched node voltage reference (Vmax) of the obtained switched node voltage references (Va*, Vb*, Vc*) and to adjust the first intermediate voltage (Vx) such that the first intermediate voltage (Vx) tracks the maximum (Vmax) switched node voltage reference (Va*, Vb*, Vc*), and wherein to adjust the second intermediate voltage (Vz) comprises to select a minimum switched node voltage reference (Vmin) of the obtained switched node voltage references (Va*, Vb*, Vc*) and to adjust the second intermediate voltage (Vz) such that the second intermediate voltage (Vz) tracks the minimum switched node voltage reference (Vmin) of the obtained switched node voltage references (Va*, Vb*, Vc*).

21. The controller of claim 20, wherein an output voltage (Vout) having a first output voltage portion (Vp) and a second output voltage portion (Vr) is outputted from the output (p, r), and wherein to operate the power converter arrangement in the first operating mode comprises to operate the power converter arrangement in the first operating mode during a first condition in which a magnitude of the first output voltage portion (Vp) is lower than the maximum switched node voltage reference (Vmax) and a magnitude of the second output voltage portion (Vr) is lower than the minimum switched node voltage reference (Vmin).

22. The controller of claim 21, wherein the controller is further configured to operate the power converter arrangement in a second operating mode during a second condition in which the magnitude of the first output voltage portion (Vp) is higher than the magnitude of the maximum switched node voltage reference (Vmax) and the magnitude of the second output voltage portion (Vr) is higher than the magnitude of the minimum switched node voltage reference (Vmin), wherein to operate the power converter arrangement in the second operating mode comprises:

to deactivate the second power converter (2).

23. The controller of claim 20, wherein the output signal (Sout) is one of an output current (Iout) and an output voltage (Vout) of the power converter arrangement.

24. An apparatus comprising the power converter arrangement and the controller of claim 20.

* * * * *